US010580091B2

(12) United States Patent
Varma et al.

(10) Patent No.: US 10,580,091 B2
(45) Date of Patent: Mar. 3, 2020

(54) SYSTEMS AND METHODS FOR DYNAMICALLY IDENTIFYING AND PRESENTING MATCHING USER PROFILES TO A USER

(71) Applicants: Sanjay Varma, Hong Kong (CN); Ashvin Praveen Sologar, London (GB)

(72) Inventors: Sanjay Varma, Hong Kong (CN); Ashvin Praveen Sologar, London (GB)

( * ) Notice: Subject to any disclaimer, the term of this patent is extended or adjusted under 35 U.S.C. 154(b) by 429 days.

(21) Appl. No.: 15/141,052

(22) Filed: Apr. 28, 2016

(65) Prior Publication Data

US 2017/0316515 A1    Nov. 2, 2017

(51) Int. Cl.
*G06Q 50/00*       (2012.01)
*H04L 29/08*       (2006.01)

(52) U.S. Cl.
CPC .......... *G06Q 50/01* (2013.01); *H04L 67/125* (2013.01); *H04L 67/18* (2013.01); *H04L 67/306* (2013.01)

(58) Field of Classification Search
None
See application file for complete search history.

(56) References Cited

U.S. PATENT DOCUMENTS

| | | |
|---|---|---|
| 7,613,706 B2 | 11/2009 | Terrill et al. |
| 8,332,418 B1 | 12/2012 | Giordani et al. |
| 8,984,065 B2 | 3/2015 | Cater et al. |
| 9,275,419 B1 * | 3/2016 | Aguiar Marcano .......... G06F 16/9535 |
| 2004/0210661 A1 | 10/2004 | Thompson |
| 2005/0021750 A1 * | 1/2005 | Abrams .................. G06Q 10/10 709/225 |
| 2009/0198666 A1 | 8/2009 | Winston et al. |
| 2012/0158751 A1 * | 6/2012 | Tseng ..................... G06Q 30/02 707/751 |
| 2013/0029693 A1 | 1/2013 | Bradley, Jr. et al. |
| 2013/0179438 A1 | 7/2013 | Coldicott et al. |
| 2014/0012909 A1 | 1/2014 | Sankar et al. |
| 2014/0074824 A1 | 3/2014 | Rad et al. |
| 2015/0161567 A1 * | 6/2015 | Mondal .............. G06Q 10/1053 705/321 |

(Continued)

OTHER PUBLICATIONS

Why an introduction from a mutual friend is better than a cold call, Cankut't blog, Aug. 2012 (Year: 2012).*

(Continued)

*Primary Examiner* — Dennis W Ruhl
(74) *Attorney, Agent, or Firm* — Rudy J. Ng; Bret E. Field; Bozicevic, Field & Francis LLP

(57) ABSTRACT

Electronic computer-implemented systems and methods for dynamically identifying and presenting matching user profiles to a user are disclosed. A server system receives, from an electronic device of a user, user profile information that includes at least one user-selected goal, and stores the user profile on a database. Location information as to the geographic location of the user is also received by the server system. The user-selected goal is analyzed to extract entity and keyword samples therefrom, and matching user profiles of other users stored on the database are identified as those that have goals with similar entity and keyword samples therein. The matched user profiles are ranked based on the physical proximity between the user and the other users, and the ranked list is transmitted to the electronic device to be displayed to the user.

20 Claims, 16 Drawing Sheets

(56) References Cited

U.S. PATENT DOCUMENTS

2015/0213091 A1  7/2015  Laight et al.

OTHER PUBLICATIONS

How to introduce yourself to someone you've never met, Mason Hipp, 2007 (Year: 2007).*
Oana Goga, Matching user accounts across online social networks: methods and applications, Universite Pierre et Marie Curie, Paris, 2014 (Year: 2014).*
On the reliability of profile matching across large online social networks, Goga et al., 2015 (Year: 2015).*
International Search Report for PCT Application No. PCT/IB2017/052394 dated Aug. 8, 2017, 4 pages.
Written Opinion for PCT Application No. PCT/IB2017/052394 dated Aug. 8, 2017, 6 pages.

* cited by examiner

SYSTEMS AND METHODS FOR DYNAMICALLY IDENTIFYING AND PRESENTING MATCHING USER PROFILES TO A USER

FIELD OF THE INVENTION

The technology described in this application relates to electronic computer-implemented systems and methods for dynamically identifying and presenting matching user profiles to a user, and related functionality.

BACKGROUND TO THE INVENTION

Person-to-person commerce has grown substantially in recent times, facilitated through the ease of communication enabled by the Internet and the rapid growth in smartphone use.

However, it remains problematic to find individuals with specific skill sets that can be trusted, or to provide services to new clients built on trust. Existing platforms that connect freelancers to potential clients include transactional services such as Upwork™, Freelancer™, Yelp™, TaskRabbit™ and Thumbtack™. These services typically source individuals who offer commoditized services in a race to the bottom for price without trust. Posts on social networks such as Facebook™ or Twitter™ are ephemeral and require constant re-posting to remind an audience they exist. Business networks such as LinkedIn™ function primarily as online resumes that tend to be static in nature, and asking friends for referrals is time-consuming and spends scarce social capital.

There is currently no effective system for matching a person with the people he or she should know, who are also looking for them.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

According to the technology there is provided a computer-implemented method for dynamically identifying and presenting matching user profiles to a user comprising, at a server system:

receiving, from an electronic device of the user, user profile information that includes at least one user-selected goal;

causing the user profile to be stored on a database;

receiving, from the electronic device of the user, location information as to the geographic location of the user;

analyzing the at least one user-selected goal to extract entity and keyword samples therefrom, identifying matching user profiles of other users stored on the database that have user goals with similar entity and keyword samples therein;

ranking the user profiles of the other users based on the physical proximity between the user and the other users, and transmitting the ranked list of user profiles to the electronic device to be displayed to the user.

Further features provide for the user goal to be analyzed to extract taxonomy samples therefrom, and for the matching user profiles to be identified that have user goals with similar taxonomy samples therein.

Further features provide for the user-selected goal to be a string of words provided by the user and to be categorized as either a service offered by the user, or as a person, service or thing sought by the user. A goal categorized as a service offered by the user may commence with "I can provide" and a goal categorized as a person, service or thing sought by the user may commence with "I want to meet". Matching user profiles of other users may be identified that have differently categorized user goals with similar entity and keyword samples therein.

Further features provide for the user profile of the user to include the user's contacts, and for the method to include the step of: ranking the user profiles of the other users based on social proximity, being the number of common contacts shared between the user and the other users.

Further features provide for the user profile of the user to include the user's networks, and for the method to include the step of: ranking the user profiles of the other users based on the number of common networks shared between the user and the other users.

Further features provide for the user profile of the other user to include the user's interests, and for the method to include the step of: ranking the user profiles of the other users based on the number of common interests shared between the user and the other users.

Further features provide for a user trust vector to be stored on the database in association with the user profile, the user trust vector having factors that indicate the user's preference for matches by goal, proximity, social proximity and personality proximity, and for the matching user profiles to be ranked by at least partially using the user trust vector. The user trust vector may be automatically adjusted by analyzing and classifying the user based on prior behavioral data that includes the times and manner in which a user interacts with other user profiles.

The method may include the steps of:

transmitting for display in association with a presented user profile, the details of a contact shared by the user and the user of the presented user profile;

receiving a request from the user for the shared contact to introduce the user and the user of the presented user profile;

transmitting a request to the shared contact for an introduction;

receiving an introduction from the shared contact; and transmitting the introduction to the user and the user of the presented user profile.

The technology extends to a computer-implemented method for dynamically identifying and presenting matching user profiles to a user comprising, at an electronic device:

receiving user profile information that includes at least one user-selected goal;

transmitting the user profile information to a server system to be stored on a database;

transmitting location information as to the geographic location of the user to the server system;

receiving a ranked list of user profiles of other users from the server system, the server system identifying matching user profiles of other users stored on the database by analyzing the at least one user-selected goal to extract entity and keyword samples therefrom, identifying matching user profiles of other users stored on the database that have user goals with similar entity and keyword samples therein, and ranking the user profiles of the other users based on the physical proximity between the user and the other users; and presenting the ranked user profiles to the user on a display of the electronic device.

Further features provide for the user-selected goal to be a string of words provided by the user and categorized as either a service offered by the user, or as a person, service or thing sought by the user.

Further features provide for matching user profiles of other users to be identified that have differently categorized user goals with similar entity and keyword samples therein.

The method may include the steps of:

displaying in association with a presented user profile, the details of a contact shared by the user and the user of the presented user profile;

receiving a request from the user for the shared contact to introduce the user and the user of the presented user profile;

transmitting the request to the server system, the server system transmitting the request to the shared contact; and responsive to the shared contact providing an introduction, receiving the introduction from the server system and displaying the introduction to the user.

The technology further extends to a server system for dynamically identifying and presenting matching user profiles to a user, the server system comprising:

a profile receiving module for receiving, from an electronic device of a user, user profile information that includes at least one user-selected goal;

a database for storing the user profile;

a location receiving module for receiving, from the electronic device of the user, location information as to the geographic location of the user;

an analysis module for analyzing the at least one user-selected goal to extract entity and keyword samples therefrom;

an identifying module for identifying matching user profiles of other users based on the physical proximity between the user and the other users, and a transmitting module for transmitting the ranked list of user profiles to the electronic device to be displayed to the user.

The technology further extends to an electronic device for dynamically identifying and presenting matching user profiles to a user, comprising:

a profile creation module for inputting user profile information that includes at least one user-selected goal;

a profile transmitting module for transmitting the user profile information to a server system to be stored on a database;

a location transmitting module for transmitting location information as to the geographic location of the user to the server system;

a receiving module for receiving a ranked list of user profiles of other users from the server system, the server system identifying matching user profiles of other users stored on the database by analyzing the at least one user-selected goal to extract entity and keyword samples therefrom, identifying matching user profiles of other users stored on the database that have user goals with similar entity and keyword samples therein, and ranking the user profiles of the other users based on the physical proximity between the user and the other users; and display for presenting the ranked user profiles to the user.

The technology further extends to a computer program product for dynamically identifying and presenting matching user profiles to a user, the computer program product comprising a computer-readable medium having stored computer-readable program code for performing the steps of:

receiving, from an electronic device of the user, user profile information that includes at least one user-selected goal;

causing the user profile to be stored on a database;

receiving, from the electronic device of the user, location information as to the geographic location of the user;

analyzing the at least one user-selected goal to extract entity and keyword samples therefrom, identifying matching user profiles of other users stored on the database that have user goals with similar entity and keyword samples therein;

ranking the user profiles of the other users based on the physical proximity between the user and the other users, and transmitting the ranked list of user profiles to the electronic device to be displayed to the user.

The technology yet further extends to a computer program product for dynamically identifying and presenting matching user profiles to a user, the computer program product comprising a computer-readable medium having stored computer-readable program code for performing the steps of:

receiving user profile information that includes at least one user-selected goal;

transmitting the user profile to a server system to be stored on a database;

transmitting location information as to the geographic location of the user to the server system;

receiving a ranked list of user profiles of other users from the server system, the server system identifying matching user profiles of other users stored on the database by analyzing the at least one user-selected goal to extract entity and keyword samples therefrom, identifying matching user profiles of other users stored on the database that have user goals with similar entity and keyword samples therein, and ranking the user profiles of the other users based on the physical proximity between the user and the other users; and presenting the ranked user profiles to the user on a display of the electronic device.

The computer-readable medium may be a non-transitory computer-readable medium and the computer-readable program code may be executable by a processor.

Embodiments of the invention will now be described, by way of example only, with reference to the accompanying drawings.

DETAILED DESCRIPTION WITH REFERENCE TO THE DRAWINGS

Figure 1:
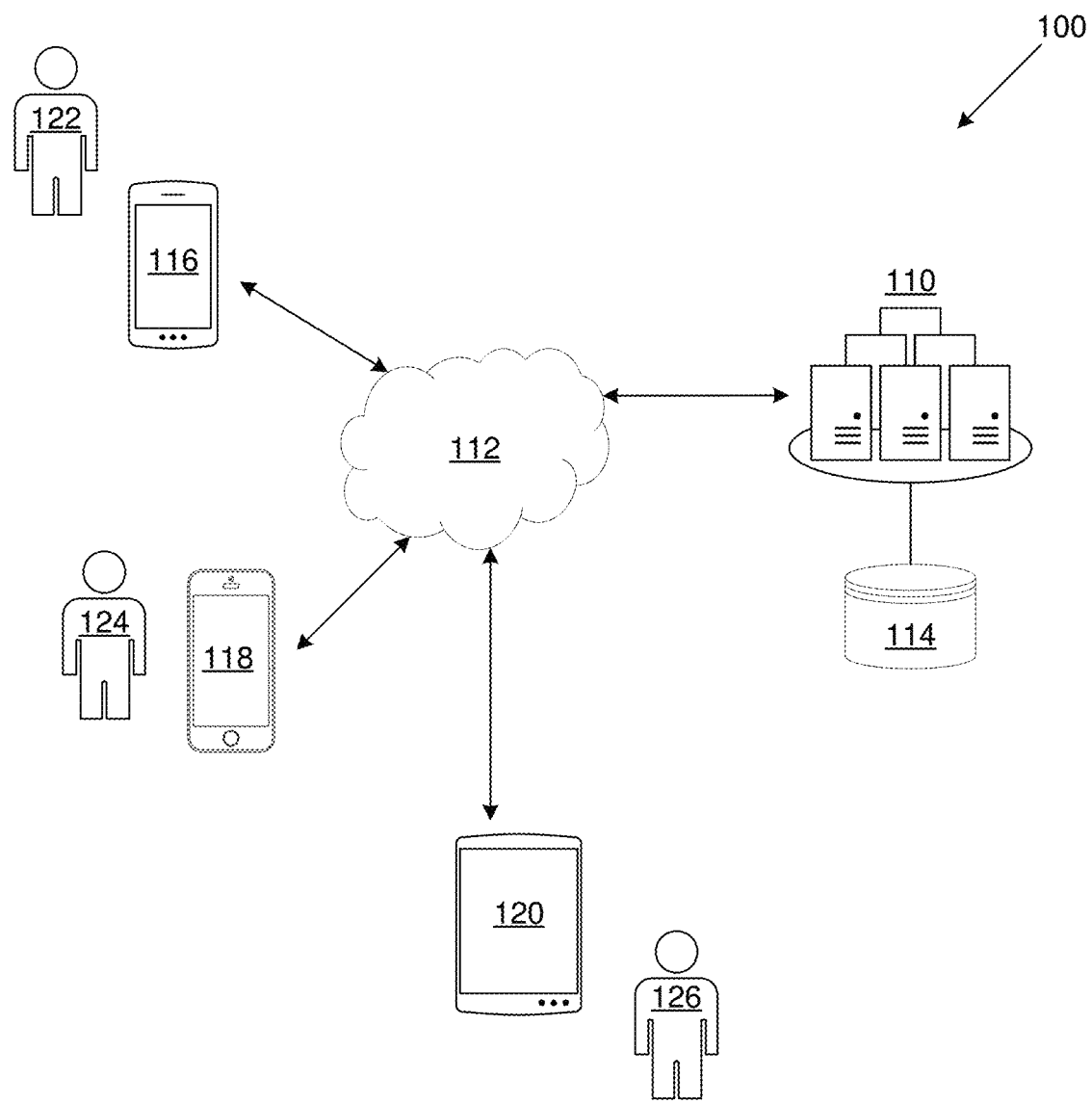
FIG. 1 is a schematic illustration of an embodiment of a system for dynamically identifying and presenting matching user profiles to a user according to the technology.

FIG. 1 illustrates an embodiment of a system (100) for dynamically identifying and presenting matching user profiles to a user according to the technology. The system (100) includes a server system (110) in communication with a plurality of electronic devices over a communication network (112). A database (114) is associated with the server system (110). In the present embodiment, three electronic devices (116, 118, 120) are shown, each electronic device belonging to an associated user (122, 124, 126). Although only three devices are shown, it is of course understood that a large number of devices will be included in the system. In a preferred embodiment, a mobile application operating on the electronic devices will facilitate operation of the system, although the system may be operated through other means on the electronic devices such as a webpage accessible by a web browser.

Any suitable electronic device may be used, including, but not limited to, a mobile smartphone, a tablet computer, a desktop, laptop, smart watch, wearable computer or the like. Communication between the server system and each electronic device may take place over any suitable communication network (112), including a local wireless network, third generation (3G), fourth generation (4G) or fifth generation (5G) cellular network, high-speed downlink packet access (HSDPA) network, and general packet radio service (GPRS) network to name but a few examples. In a preferred embodiment, each electronic device is capable of directly communicating with the server system through the communication channel, however, it is envisaged that this may not always be possible and in such cases an electronic device may be enabled to communicate with the server system utilizing the communication capabilities of another communication device, for example a smart watch that uses the communication capabilities of a smartphone.

Each electronic device may include a location detection system which enables the device to determine its location. The location detection system may be a Global Positioning System (GPS), a Wireless Positioning System (WPS), a Local Positioning System (LPS), an Indoor Positioning System (IPS), or the like. In some embodiments, the electronic devices may not be provided with their own location detection systems but their locations may nevertheless be capable of being determined by the server system through means such as locating an internet protocol (IP) address of the electronic device, or by means of the user manually providing a location.

The technology described in this application provides computer-implemented methods and systems for dynamically identifying and presenting matching user profiles to a user. The server system (110) receives, from the electronic devices (116, 118, 120) of the users (122, 124, 126), user profile information that includes at least one user-selected goal. Each user-selected goals may be a string of words provided by the user and categorized as either a service offered by the user, or as a person, service or thing sought by the user. A goal categorized as a service offered by the user may commence with "I can provide" and a goal categorized as a person, service or thing sought by the user may commence with "I want to meet". The user profiles are stored on the database (114). The server system (110) also receives location information as to the geographic location of the users.

The user-selected goals are analyzed to extract entity samples, keyword samples and taxonomy samples therefrom. Entity samples are words that represent a person or thing, keyword samples are words critical to the understanding of a phrase and taxonomy samples are hierarchical positioning of core ideas in a larger tree of ideas. Matching user profiles of other users stored on the database are identified based on user goals (especially differently categorized user goals) that have similar entity, taxonomy and keyword samples therein. These user profiles are ranked based on the physical proximity between the user and the other users, and the ranked list of user profiles is transmitted to an electronic devices to be displayed to the user.

Figure 2:
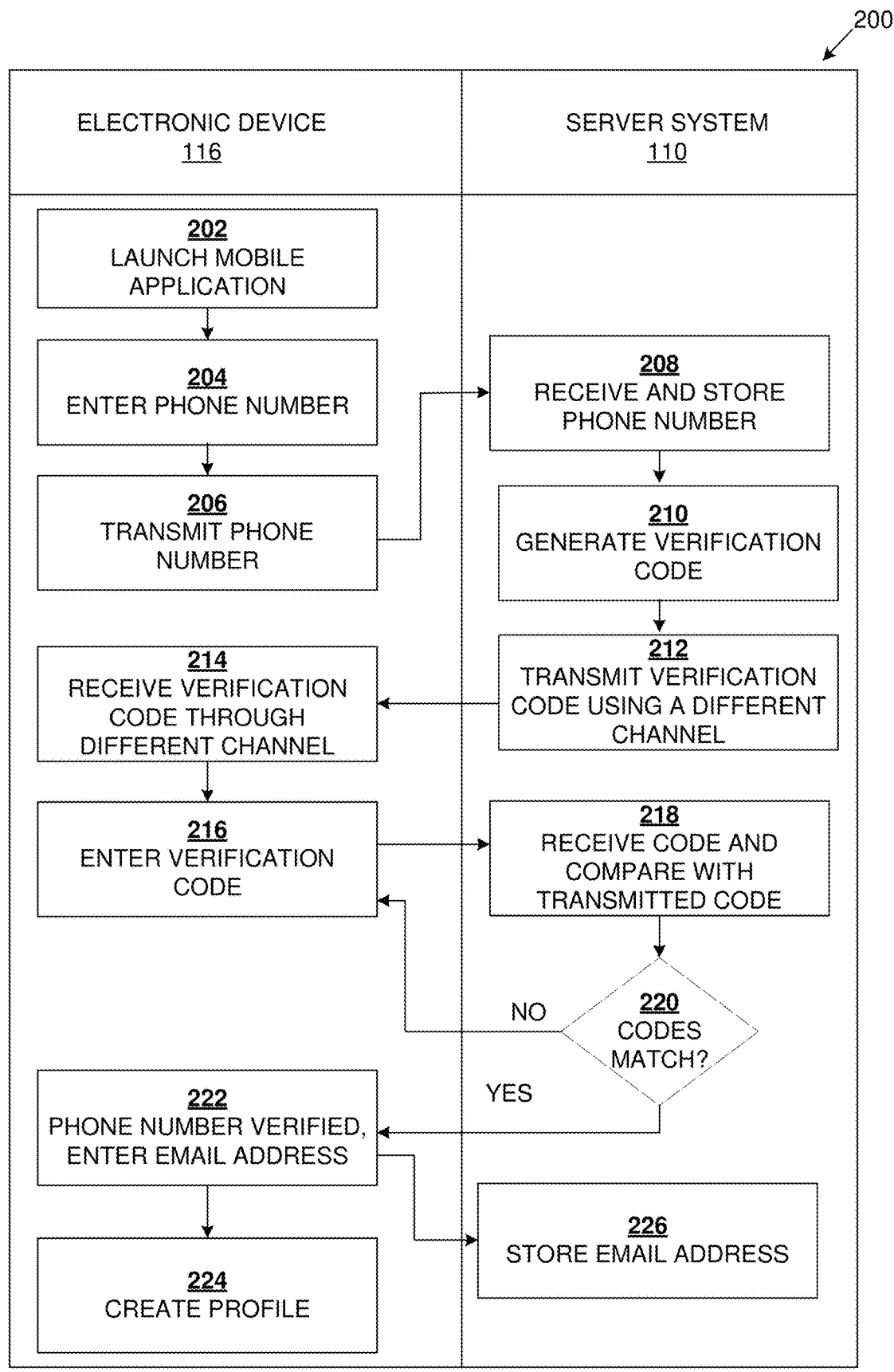
FIG. 2 is a flow diagram illustrating a method of registering a new user according to the technology.
Figure 3A:
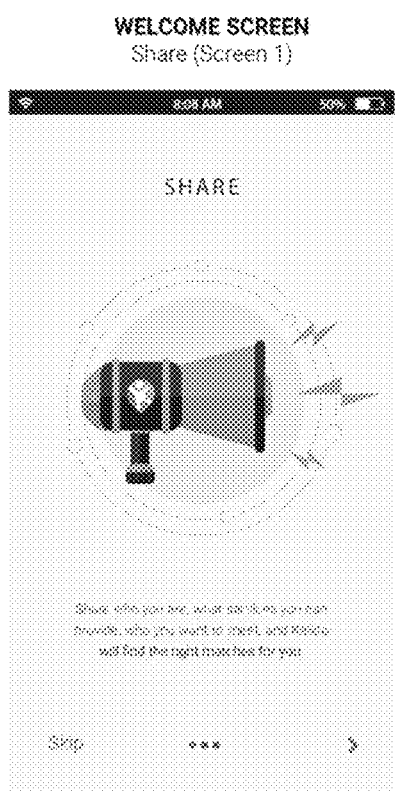
FIGS. 3A to 3G are illustrative screen shots showing exemplary stages of registering a new user.
Figure 3B:
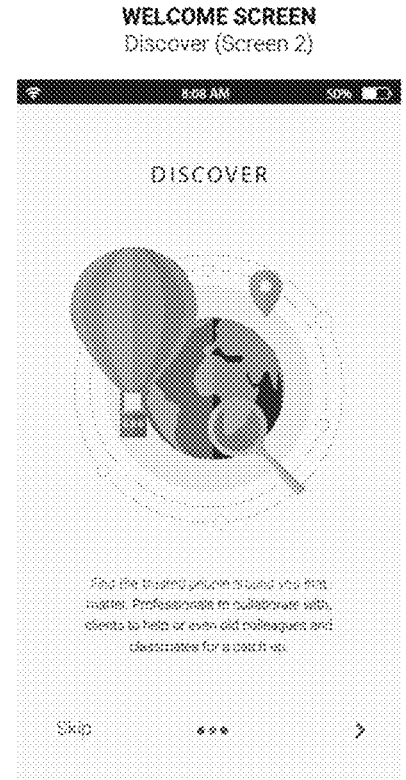
Figure 3C:
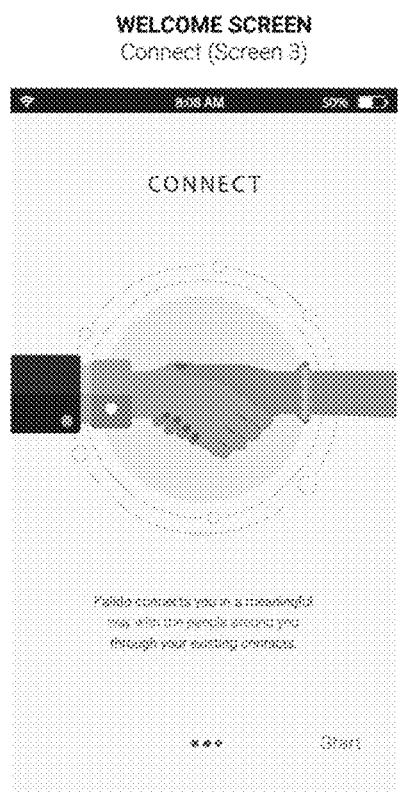
Figure 3D:
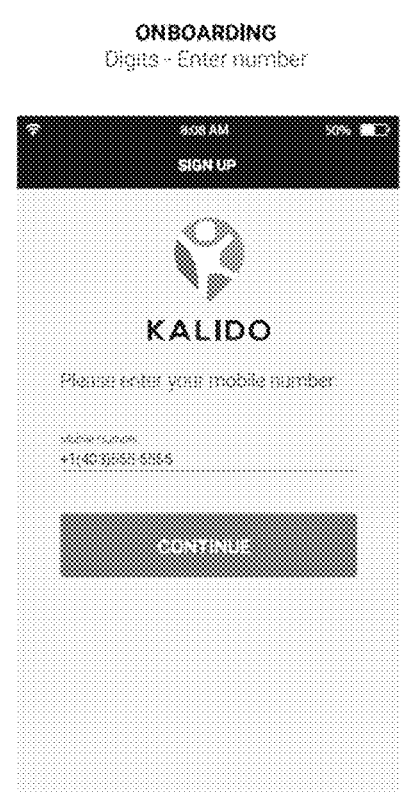
Figure 3E:
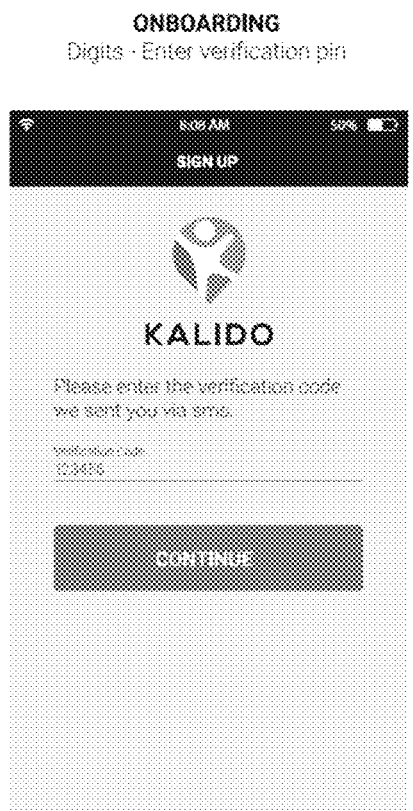
Figure 3F:
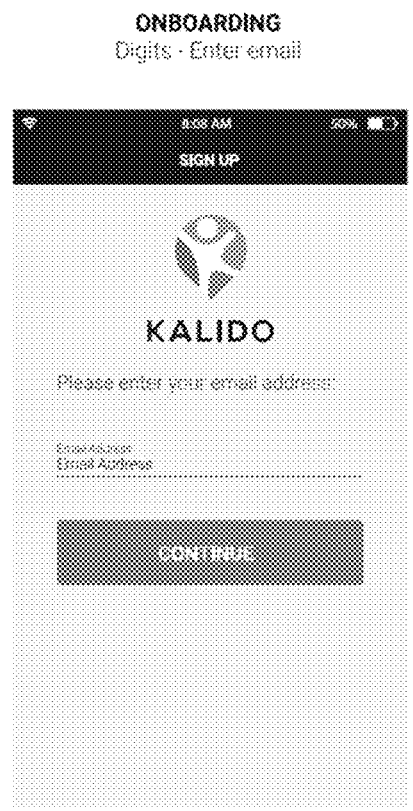
Figure 3G:
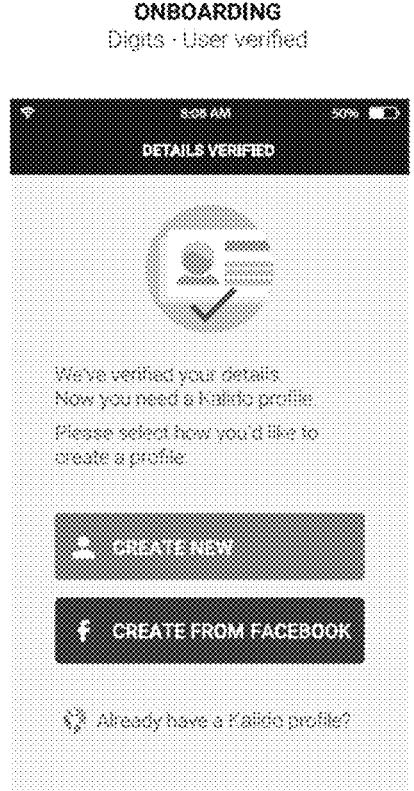

FIG. 2 is a flow diagram illustrating an example embodiment of a method (200) of registering (also referred to as on-boarding) a new user according the technology and shows the method as carried out at an electronic device (116) of a user and as carried out at a server system (100). FIGS. 3A to 3G show corresponding screen shots of exemplary user interfaces that could be used in the method. According to the method, a user installs and launches (202) a mobile application on his/her electronic device, in this embodiment, the user's smartphone. Upon first launching the mobile application, three welcome displays shown in FIGS. 3A to 3C are displayed for the user to swipe through. These welcome displays provide an overview of the functionality of the system and are for informative purposes only.

The user is then prompted to enter (204, FIG. 3D) a mobile phone number. The user enters their mobile phone number which is transmitted (206) it to the server system. The server system receives (208) the phone number and stores it on the database in association with a new user profile. The server system then generates (210) a verification code and transmits (212) the verification code to the electronic device using a different channel, typically through a channel such as Short Message Service (SMS). Transmitting the verification code through a different channel than the mobile application ensures that only a user in control of that other channel will receive the verification code. If SMS is used as the channel, only a user in possession of the mobile device subscriber identify module (SIM) associated with the SMS should receive the SMS. Therefore, using SMS as a verification channel provides a high degree of certainty that a user is providing their true mobile phone number. It will be appreciated that the server system may interface with a third bulk messaging service for the generation and transmission of such verification codes.

The user receives (214) the verification code through the different channel and enters (216, FIG. 3E) the code. The server receives (218) the code and compares it with the transmitted code. If the codes do not match, the user is prompted to enter (216) the verification code again. If the codes do match, the user's mobile phone number is verified and the user is prompted to enter (222, FIG. 3F) their email address. Similar verification steps (210 to 220) could be used for the email address, but the necessity of verifying the email address is not as essential as the mobile phone number because the system primarily uses mobile phone numbers for matching as will be described further herein. The email address is received and stored (226) by the server system. At this point a new registered and verified user profile is stored on the database with an associated phone number and email address, and the user is prompted to proceed to create (224, FIG. 3G) a user profile.

Figure 4:
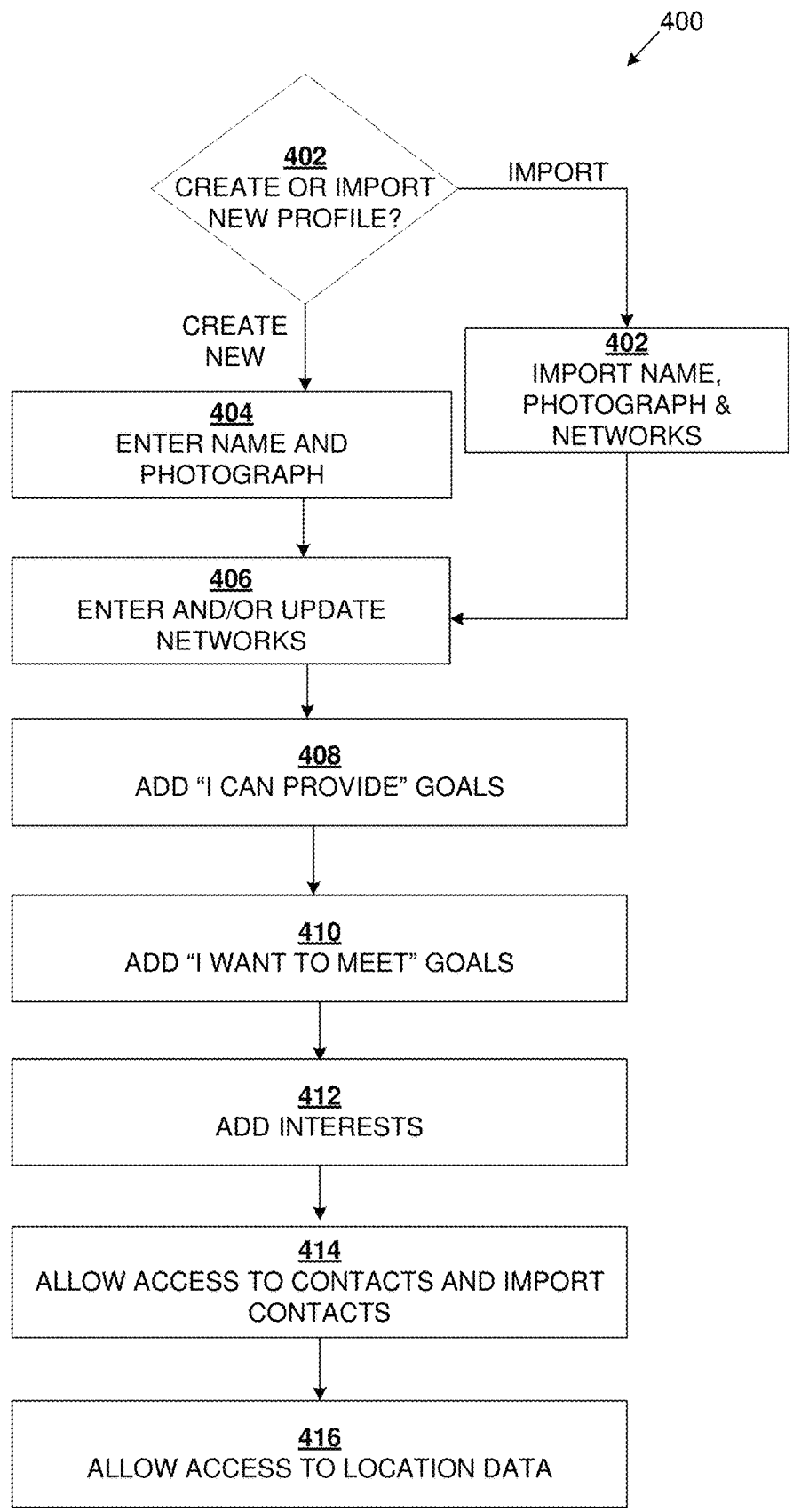
FIG. 4 is a flow diagram illustrating a method of creating and updating a user profile according to the technology.

FIG. 4 is a flow diagram illustrating an example embodiment of a method (400) of creating and updating a user profile as carried out at a mobile device of the user, and FIGS. 5A to 5H show corresponding screen shots of exemplary user interfaces that could be used in the method. As shown in previous FIG. 3G, the user is prompted (402) to either create a new profile or import an existing profile from a third party service, such as Facebook™ or other social network. If the user selects to import an existing profile, the server system connects to the third party service and obtains the necessary permissions to import (402) the user's information, such as name, photograph and networks, as will be described below. It should be noted that only some of a user's profile information could be imported from social networks such as Facebook™ and Twitter™ and that the rest of the user's profile information could be provided manually by the user. If the user selects to create a new profile, the user is prompted to enter (404, FIG. 5A) their name and choose a photograph to be a profile picture.

Figure 5A:
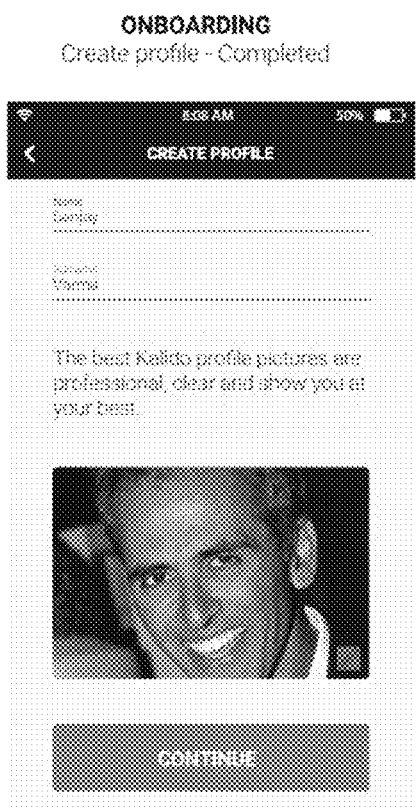
FIG. 5A to 5H are illustrative screen shots showing exemplary stages of creating and updating a user profile.
Figure 5B:
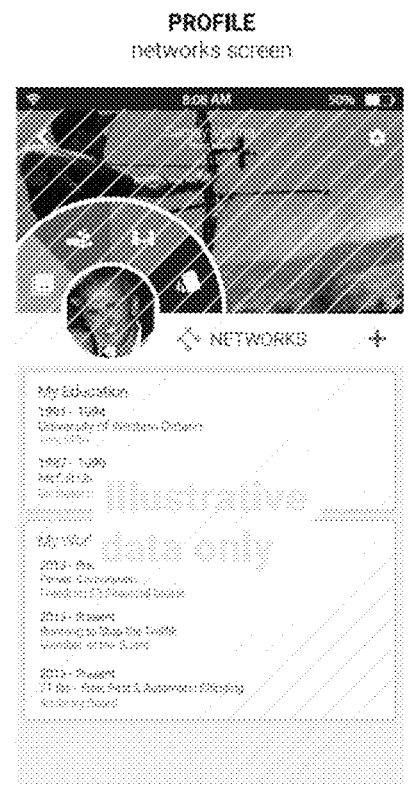

The user is then enabled to enter and update their networks (406, FIG. 5B). A user's networks may be the user's work history including a list of companies with job titles and service dates, educational history including a list of educational institutions with certification titles and attendance dates, and any other affiliations such as clubs, societies or volunteer groups which also have dates and roles attached. For example, a user may have studied at the University of Western Ontario from 1991 to 1994 and obtained a master's degree in business administration (MBA) and may be working for Power Corporation as a Financial broker from 2013 to present, and these could be provided as the user's networks.

The user is then enabled to enter and update the user's goals. A user goal may be a string of words provided by the user which could include one or more services offered by the user and/or one or more services sought by the user. User's goals are categorized as either "I can provide" goals which include services offered by the user or "I want to meet" goals which include people or things sought by the user. For example, a user may have experience in life insurance and retirement planning and can have as an "I can provide" goal that "I can provide life insurance services and retirement planning advice". A different user may require an expert for life insurance and could have as an "I want to meet" goal that "I want to meet a retirement planner who can advise me on trusts". A user's goal could also have one or more multimedia files such as images or videos linked to it. For example, a user may want to meet an architect to build a house for the user, and could have as a goal "I want to meet an architect who can build me a house like this" where images of a house are displayed in association with this goal.

Figure 5C:
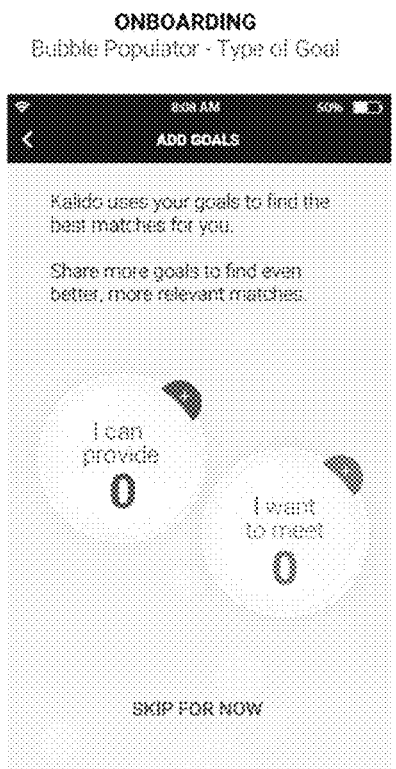
Figure 5D:
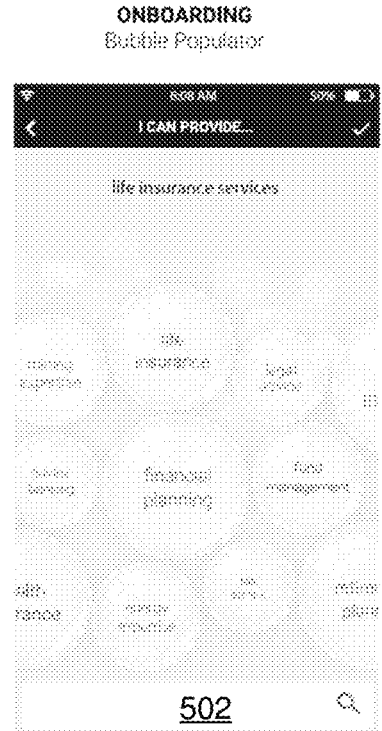

The screen shot shown in FIG. 5C prompts the user to enter his or her "I can provide" and "I want to meet" goals. By pressing on "I can provide", the user is able to add (408, FIG. 5D) the "I can provide goals". FIG. 5D shows an exemplary interface by means of which the "I can provide" goals are entered. The interface includes a text bar (502) in which the user can type the goal, and also includes a visual tool (504) to assist the user in populating the goal. The visual tool (504) includes a number of pre-populated bubbles which can be "popped" by selecting them, each selection action drilling down to a further level of detail.

The bubbles are configured by an administrative user of the server system and fit within a category-object-property-value logical data set pre-configured by the administrator. A category is field such as medical, sport, art, beauty or engineering. Each category contains a set of objects defining a type of person who may belong to that category. One object could be connected to more than one category. For example, a dentist may be in a medical category while a plastic surgeon could be in both a beauty category and a medical category.

Each category also has a set of properties, which explain why the object is important to another person. Properties could be, for example, studied, studied at, when to school in, can help me design, knows and so on. Each property has a set of linked values, which are concepts that can be linked to specific properties. For example, the property "studied at" might be linked to a set of schools, the property "studied" might be linked to a set of university degrees, and the property "can help me design" may be linked to "websites".

Each object also has a prefix and postfix to support the design of a natural language sentence. For example, a prefix for "engineer" might be "an" while a postfix might be "who".

Figure 5E:
Figure 5F:
Figure 5G:

The visual tool (504) displays a number of values that the user can select so as to build an "I can provide" goal. For example, the user can select "life insurance" and "retirement planning" so as to build an "I can provide goal" that reads, "I can provide life insurance services and retirement planning advice", as shown in FIGS. 5D and 5E.

A similar visual tool can be used to populate the user's "I want to meet" goals. In that case, the visual tool displays a number of objects (i.e. people) first. Upon selecting an object (for example, "engineer"), the visual tool then displays a number of properties, for example "studied at", "can build", "knows". After selecting a property, the visual tool then displays a number of values, for example "bridges", "Harvard", "Java". In this way, the user can rapidly add goals such as, "I want to meet an engineer who can build bridges".

The server system may also enable advertisers to connect to the server system to provide certain functionality. For example, advertisers may provide the system with a specific "word bubble" which may be provided to users who have previously entered goals with particular keywords, or who are active in a particular geographical location. For example, an advertiser might provide the system with "Yoga Instructor" as a word bubble for users in Kensington, London if he has just opened a yoga studio in this neighborhood. The server system may provide users located in Kensington with the word bubble "Yoga Instructor" to add as a "meet" goal.

After completing the "I can provide" and "I want to meet" goals, the user is then prompted to add (412, FIG. 5G) a list of interests. The interests can be any person, concept or thing that the user is interested in. A similar visual tool can be used to populate the user's interests.

Figure 5H:
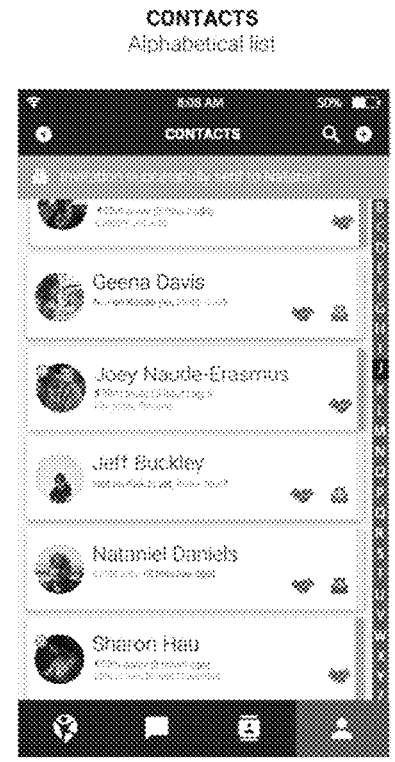

At some stage in setting up the user profile, the user allows the mobile application to access the list of contacts stored on the device, and the contacts are imported (414) by the mobile application and stored in association with the user profile at the server system. FIG. 5H shows an exemplary user interface of the user's contacts. By importing the user's contacts, including names, phone numbers and, if available, email addresses and names of companies and job titles, the server system is able to create a social graph based on the combined data of all users' contact databases, which identifies how individuals are connected by, for example, determining how many shared contacts any two users have.

Figure 6:
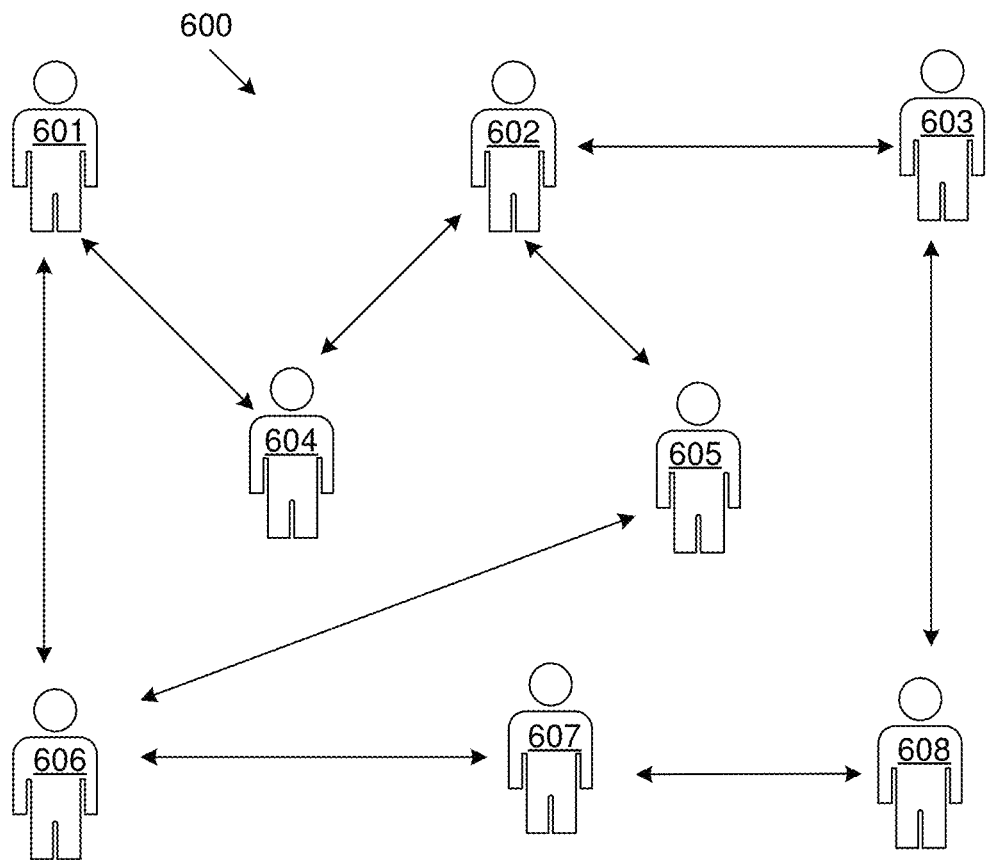
FIG. 6 illustrates a social graph.

FIG. 6 illustrates a social graph (600). The social graph may identify the social proximity between any two users, as well as any shared networks or interest any two users have. FIG. 6 shows how eight users (601 to 608) are connected to each other. User 601 is directly connected to user 604. It should be noted that direct connection typically means that the users have each other's contact details (specifically mobile phone numbers) in their list of electronic device contacts. User 601 is connected to user 602 via his/her mutual connection to user 604. Therefore, user 601 may request user 604 for an introduction to user 602 and vice versa as will be explained below.

Referring back to FIG. 4, in a final step the user allows the mobile application to access (416) location data of the device. This typically allows the mobile application to use the built-in location detection system, such as the GPS chip, on the electronic device to report its location to the server system. It should be noted that the user's geographic location may be updated every time the user moves more than a specific distance, for example a 5 km distance. This distance may be altered to optimize battery life for the user's electronic device.

Importantly, according to the technology the server system is capable of dynamically identifying and presenting matching user profiles to a user, by using the following information of all users: the location of the users, the networks and interests of the users, the social graph based on the combined contacts of the users, and the "I can provide" and "I want to meet" goals of the users.

Figure 7:
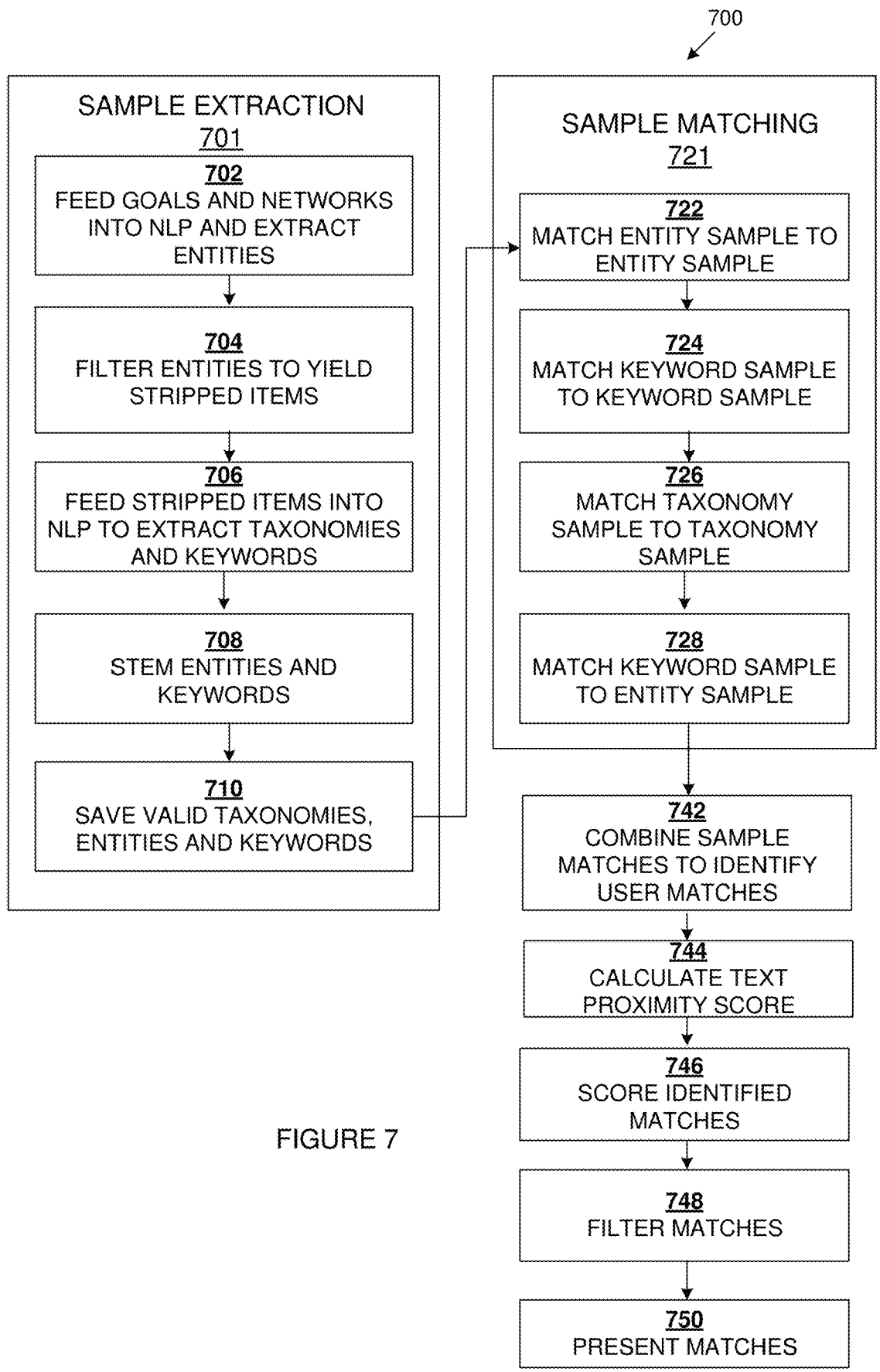
FIG. 7 is a flow diagram of a method of matching user profiles according to the technology.

FIG. 7 shows a flow diagram of a method (700) of matching user profiles according to the technology. A first stage (701) involves sample extraction. Each goal and network item is fed (702) into a natural language processing (NLP) system, which extracts entities from the goal and network items. An entity may be a word or groups of words that signifies a person, such as George Washington, an institution such as the University of Michigan, a name, a job title, and any other significant thing such as Lake Superior.

The entities are then filtered (704) to remove entities that are on an exclude list so as to ensure that unwanted entities do not skew the results. All occurrences of those entities are removed to yield stripped goal and network items. The stripped items are then fed (706) in the NLP which analyzes each goal and network item and extracts taxonomies and keywords. A taxonomy may be a hierarchical positioning of the core ideas in a larger tree of ideas, while a keyword may be a word or words which are critical to the understanding of a phrase. For example, if the phrase "I want to meet a software developer who can build an android application" is entered, the following taxonomies could be identified and extracted: technology, computer, consumer electronics, telephones, mobile phones, smart phones. Keywords would include "build".

The entities and keywords are then stemmed (708) using a Porter English stem, and the valid taxonomies, entities and keywords are then saved (710). Because each taxonomy, entity and keyword provides a sample of knowledge about the applicable goal or network, they are referred to as item "samples".

A next stage (721) involves sample matching. During this stage, separate text match queries are created for entity, taxonomy and keyword samples. Matches can occur between the two types of goals ("I can provide" and "I want to meet" goals), between networks, or between either of the types of goals and networks.

At a first step (722), entity samples are matched with other entity samples. This can be in the form of an entity network to network match, an entity "I want to meet" goal to network match, an entity network to "I want to meet" goal match, an entity "I want to provide" goal to "I want to meet" goal match, an entity "I want to meet" goal to "I want to provide" goal match, and an entity "I want to meet" goal to "I want to meet goal" match.

An example of an "I want to meet" goal to "I want to meet" goal match would be where two people enter goals like "I want to meet a running partner", where it is critical that a word like "partner" is included, or a similar word denoting a desire to meet someone to do something with.

An entity network to network match only occurs if the entity is not a job title type. This prevents users with the same job title from automatically matching with each other. Entity network to network matches may also be restricted based on whether the users in question have shared contacts, to diminish the likelihood of unwanted matches.

An entity "I want to meet" goal to network match occurs when a user's "I want to meet" goal matches a network item on any type of entity. This allows a user with a goal to be matched to another user who is at a particular company, or who went to a particular university, or who has a particular job title. An entity network to "I want to meet" goal match occurs when a network item on any type of entity matches a user's "I want to meet" goal. An entity "I want to provide" goal to "I want to meet" goal match occurs when a user's "I want to provide" goal matches another user's "I want to meet" goal on any type of entity. Lastly, an entity "I want to meet" goal to "I want to provide" goal match occurs when a user's "I want to meet" goal matches another user's "I want to provide" goal on any type of entity.

At a next step (724), keyword samples are matched with other keyword samples. This can be in the form of a keyword network to network match, and a keyword "I want to meet" goal to "I can provide" goal match. Both the keyword network to network match and keyword "I want to meet" goal to "I can provide" goal match are bidirectional exact text matches on either stemmed or un-stemmed keywords.

At a further step (726), taxonomy samples are matched with other taxonomy samples. This can occur on a loose or strict level. A taxonomy may take the form of a three part hierarchy, for example, x/y/z where 'x' is the most general category and 'z' is the most specific category. A loose match between two taxonomies is defined as an exact text match on the most general level of the taxonomy while a strict match between two taxonomies is defined as an exact match for all levels of the taxonomy. It should be noted that taxonomy matching is also bidirectional.

Lastly for the matching stage, keyword samples are matched (728) to entity samples. This can provide a match between keywords and entities, and can cater for situations where certain job titles are entities and are to be matched with keywords. This occurs, for example, when an entity is a job title and also part of somebody else's "I want to meet" goal, such as, "I want to meet a programmer", which can be matched with "I can provide programming". Matches between stemmed keywords and stemmed entities are therefore searched and this type of match will have a high match strength since it focuses on complementary goals.

Sample matches are then combined (742) to identify matches between users. To make matching stricter, matches between two users are only identified where sample matches occur in one of the following situations: a keyword-to-keyword match occurs and a strict taxonomy-to-taxonomy match occurs, or more than one keyword-to-keyword match occurs and a loose taxonomy-to-keyword match occurs, or an entity-to-entity match occurs, or a keyword-to-entity match occurs, or a keyword-to-keyword match occurs and it forms at least X % of the total items being matched (where X is a parameter to be tuned).

For each identified match between users, a text proximity score is then calculated (744). The text score is a function of the percentage of the original two texts that the entity, keyword, and taxonomy samples matched on, scaled by whether those matches are strict or loose (in the case of taxonomy matches), stemmed or un-stemmed and ranking on the type of match. Each match is allocated a match strength. Matching that occurs on a stemmed version of the sample will have a lower match strength than matching on the un-stemmed sample, and matching on a loose taxonomy match is scored less than a strict match.

Once matches have been identified and text proximity scores calculated, the matches are passed through a scoring function which scores (746) the identified matches for each pair of matched users. This is based on an overall text proximity score (a) between the two users; a geographical proximity (b) between the two users; a social graph proximity (c) between the two users; and, a personality proximity (d) between the two users.

The overall text proximity score between the two users is the combined total strength of all items that matched between the two users. The geographical proximity between the two users is a Gaussian score function of the distance between two users' location as determined from the GPS sensors in the users' electronic devices. The social proximity between two users makes use of the social graph, and takes into account whether the two matched users are directly connected, the number of common contacts they share, and the number of common networks between them. The personality proximity between two users is a normalized sum of the number and relatedness of interests that two users have in common.

A trust score (t) is calculated for a user by combining a vector (a, b, c, d) of the overall text proximity score, the geographic proximity, the social graph proximity, and the personal proximity with a personalized user trust vector (w, x, y z). This is depicted in the equation below:

$$t = w^*a + x^*b + y^*c + z^*d$$

The personalized user trust vector indicates a user's preference for matching based on text proximity, geographic proximity, social graph proximity and personality proximity. The user trust vector is initially set to even values such as (1,1,1,1) for a new user. With time, the user trust vector is automatically adjusted by analyzing and classifying the user based on their prior behavioral data that includes the times and manner in which a user interacts with other user profiles as well as demographic, goal related and network related information. Once enough interaction data has been obtained for a particular user, the user may be classified into a group using unsupervised learning and assigned the preferred trust vector for users within that group. For example, some users may have a preference for geographical proximity while other users may have a preference for social proximity and will be scored differently.

The matches are then filtered (748) to remove matches that do not meet a minimum threshold requirement for each sub score (a, b, c, d) or a minimum threshold requirement for the final trust score (t). In particular, matches where users are too far away from each other may be filtered out and matches that do not meet minimum per user requirements for social proximity may be filtered out.

It will be appreciated that identified matches are not necessarily presented to both users. For example, in the case of network to "I want to meet" goal matches, the identified match may be shown only to the user with the "I want to meet" goal, not to the user with the applicable network in question since that user is not consciously searching for someone. The system may also enable users to specify that they do not wish to receive communication from persons that connect only via their networks.

The technology accordingly provides a method for presenting user profiles that are likely to be a strong match for a particular user. If users have complementary goals, the server system can identify that matches exists and can sort all the matches for a particular user by a combination of social and geographic proximity. This enables the first match a user sees, to be a user who, for example, matches the goal of the other user, has at least one common contact with the other user, has at least one shared network with the other user, shares at least one common interest with the other user, and is geographically nearby. Users who meet some, but not all of this criteria will be ranked lower based on trust, where common contacts matter more than common networks or interests, and common networks matter more than common interests.

Matches are then presented (750) to users on their electronic devices. Matched user profiles presented to a user may contain user profiles arranged in a hierarchical manner, from user profiles with the closest proximity to the user, to user profiles to the furthest proximity to the user.

While the above description outlines the method conducted by a rules-based engine, the server may also be configured, in some embodiments, to implement a deep learning engine which supplements the rules-based engine's matching behavior, and in some cases supersedes the output of the rules-based engine when the results of its self-test against an objective test suite show that learned performance exceeds rules-based performance.

The server system's deep learning engine can run a goal creation algorithm which creates a random combination of cycles across categories in the form "I want to meet" or "I can provide" [Prefix] [Object] [Postfix] [Property] [Value] and some arbitrary number of repetitions of sub-cycles consisting of {"and" [Postfix] [Property] [Value]}. This generates a set of goals large enough to train the deep learning engine. The goals are then classified using a number of human mechanisms which may include a dedicated human review of goal combinations such as strong/weak/poor, where strong goals are ones that match well, weak goals do not match well but are intuitive to human beings, and poor goals do not match well. This could be done by one or two people, or using a crowdsourcing mechanism like Amazon Mechanical Turk™ or CloudFactory™. It should be noted that in all cases, the human inputs will be run through a qualification testing and voting mechanism to ensure that the inputs meet a consistent level of quality. The deep learning engine also takes user input into account, where users are able to indicate that a particular match is poor.

FIG. 8A to 8H illustrate examples of matching user profiles presented to a user. The server system may present a user with matching user profiles of other users by generating a number of cards, which are summaries of other user profiles displayed in a card feed on the mobile application user interface.

The server system may present a user with one type of card, called a "match card" when two users have complementary or similar goals. This may enable users to see each other's approximate location, neighborhood, city, and/or country. It should be noted that the approximate location may be to a minimum pre-set distance, for example, a 250 m distance between two users. Match cards may enable users to see each other's profile, including each other's networks, interests, and goals and to communicate with each other through in-app messaging or, if the users have each other's contact details in their contacts, in-app voice over IP (VOIP) protocols. Match cards may enable a shared contact to introduce two users, if each user has the shared contact in their contact list. It should be noted that a matched user may see only common networks, interest, and goals of a corresponding matched user. Further, it should be noted that a matched user may see all of a corresponding matched user's networks, interests, and goals if they have each other's contact details stored in their respective contact list.

Figure 8A:
FIG. 8A to 8L are illustrative screen shots showing matching user profiles presented to a user and other functionality.
Figure 8B:
Figure 8C:
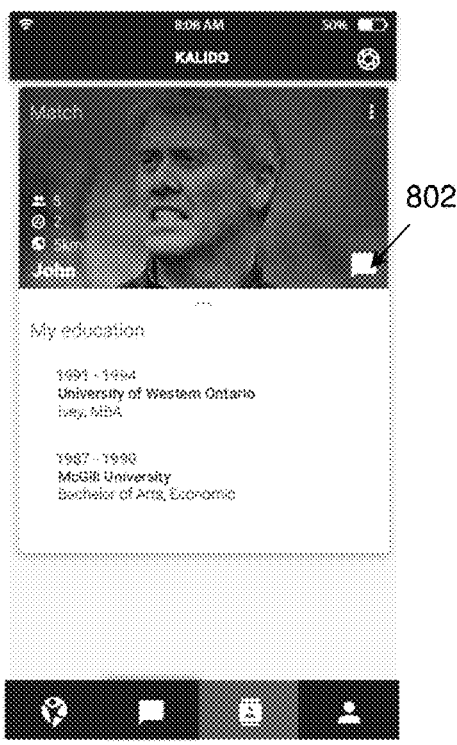
Figure 8D:

Assuming the user viewing the application is the same user (Sanjay) who set up his profile as shown in FIGS. 5A to 5H, a match card is displayed to the user as shown in FIG. 8A. In the case of this match card, the reason the person (John MacMillan) was matched was because of several factors. John MacMillan has an "I want to meet" goal of "I want to meet someone who can provide life insurance" which was matched according to the described technology with the user Sanjay's "I can provide" goal of "I can provide life insurance services and retirement planning advice". John also studied at McGill University, has five shared contacts with Sanjay, and is located 5 km away from Sanjay. With this match card, Sanjay can see John's approximate location, view John's profile including John's networks, interests, and goals as illustrated in FIGS. 8A, 8C and 8D. Sanjay can also communicate with John through in-app messaging by tapping on a message icon (802).

The server system may present a user with another type of card, called a "karma card", when a user (user A) has a goal but the server system cannot find a matching user B who has at least one shared contact or shared network. Karma cards are then sent to user A's contacts who are also using the system, asking them if they know anyone who can help user A. From the karma card, a user C can introduce user A to any person D who is in user C's contact database via SMS or email, whether or not they are signed up to the server system. An example of a Karma card (804) is shown in FIG. 8E.

The server system may present a user with another type of card, called a "discover card", which may be created manually by a particular user or by an administrator. This may be when the user or administrator feels that a service is new or unique. Advertisers, or users, may also pay to have discover cards generated for their particular service. An example of a discover card (806) is also shown in the same card feed of FIG. 8E.

Figure 8E:

The server system may present a user with another type of card, called a "nearby card" (808) when two users have not been near each other within a specific time period, for example 30 days, as illustrated in FIG. 8E. Each user may receive such a nearby card when they become near to each other, to encourage an opportunity to meet. Users who are near each other for the first time may receive a "first time nearby" card which may enable them to share their respective location with each other. A "first time nearby" card may be presented to either of the two users in a random sequence and if one chooses not to share his/her location, the other will not receive a "first time nearby" card.

When traveling, users may chose not to send or receive nearby cards to avoid an influx of notifications. Further, it should be noted that the term "near" is relative to each pair of users; for example, users who have been in the same country within a specific time period may only receive a notification when they move to the same city, while users in the same city within a specific time period may receive a notification when they move to the same neighborhood.

Figure 8F:
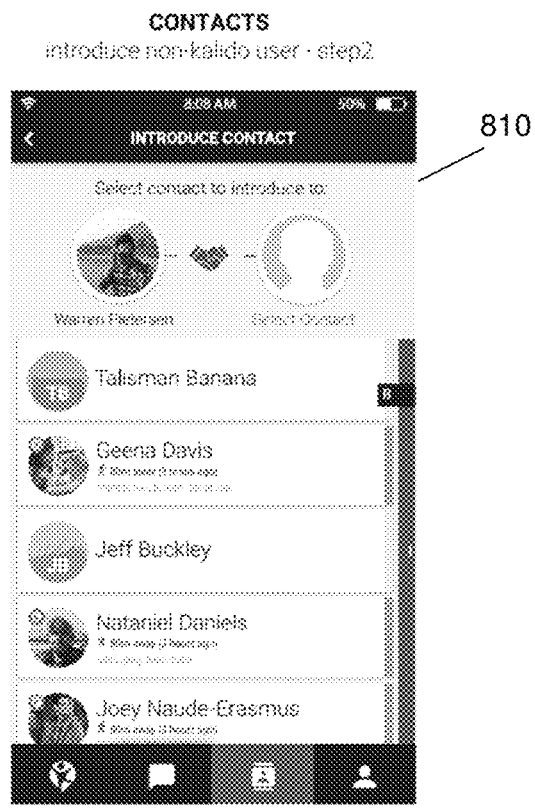
Figure 8G:
Figure 8H:
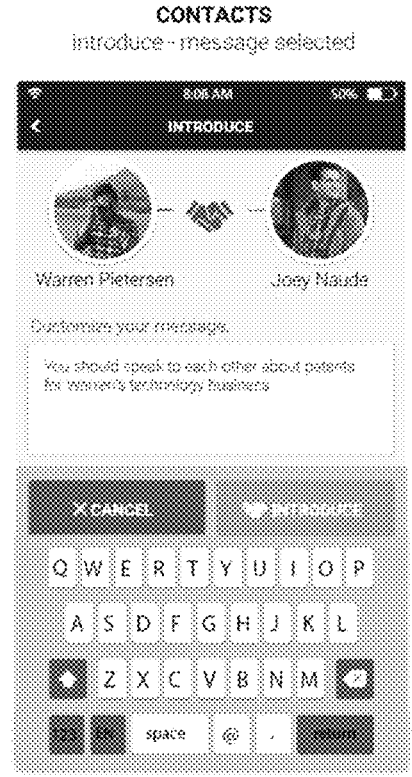

The server system may also present a user with another type of card, called an "introduction request card" (810) when a user requests an introduction from a shared contact in a match card, as illustrated in FIGS. 8F to 8H. The shared contact will receive an introduction request card where he/she can make an introduction between the two matched users. As shown in FIG. 8G and 8H, the person making the introduction is given the opportunity to select from one of a pre-defined list of introductory messages, or may write his or her own message.

The server system may present a user with another type of card, called an "introduction received card", which is received by both users who have been introduced by a third user. An introduction received card enables the recipient users to view each other's user profiles, including networks, interest, and goals, and to message each other.

The server system may further present a user with another type of card, called an "introduction successful card" when two users have been successfully introduced to each other and have communicated with each other using the mobile application installed on their respective electronic devices. The user who did the introduction may receive an introduction successful card to indicate that the introduction was successful.

Other cards may also be presented to a user by the server system. A "learn card" may offer to teach the user how to use different aspects of the mobile application which will facilitate operation of the system, and an "add to profile card" may encourage the user to add information to his/her profile to enable the system to identify more accurate matches. An "update software card" may notify the user of new and improved versions of the mobile application and may include a link to enable the user to directly download the new version of the mobile application onto his/her electronic device.

Figure 8I:

The server system may also be configured to present the user's contacts by distance rather than in alphabetical order, as shown in FIG. 8I, in which the appearance of a three-dimensional view of contacts cards is given with the nearest card being the person nearest in distance. Only users who are actual contacts (i.e. have each other's contact details) are shown in this view. In this way, if a user flies to a new city, upon landing he or she can immediately know which of their contacts are in the city, but in a way that does not compromise the privacy of the contacts as the user will only know how far away the other user is, to a minimum of 250 m, and in what neighborhood that person is. Should the user be in a different city more than 10 km away, only the city name will be shown, and should the user be in a different country, only the country name will be shown.

From within the contacts view of FIG. 8I, a user can introduce any two users, whether those users have the mobile application or not. Users simply select two users in their contact database, and select the mechanism for introduction based on the data available (e.g. one user may have a phone number listed, while the other has both a phone number and an email listed).

The introducing user is then, as shown in FIG. 8H, shown a set of predefined text options that can be customized as needed. Should an introduced user not be a user of the system, he/she will receive a customized email or SMS with a note explaining that they have been introduced to someone on by means of the mobile application, and a deep link to download the mobile application. Upon downloading the mobile application and registering, a chat will automatically be started between the two users and an "introduction received" card will be shown in their card feeds.

Figure 8J:
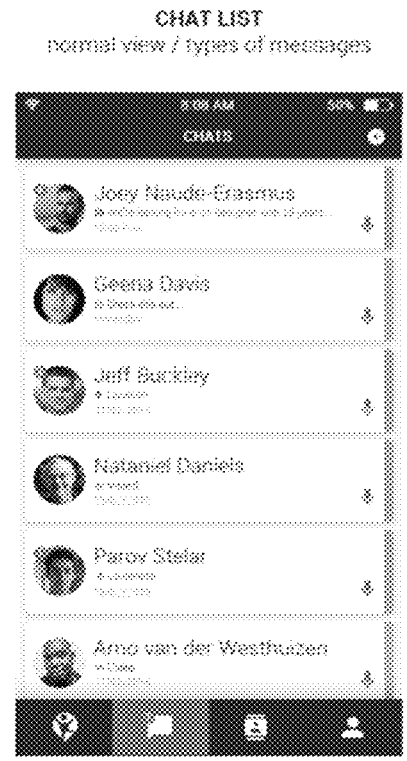
Figure 8K:
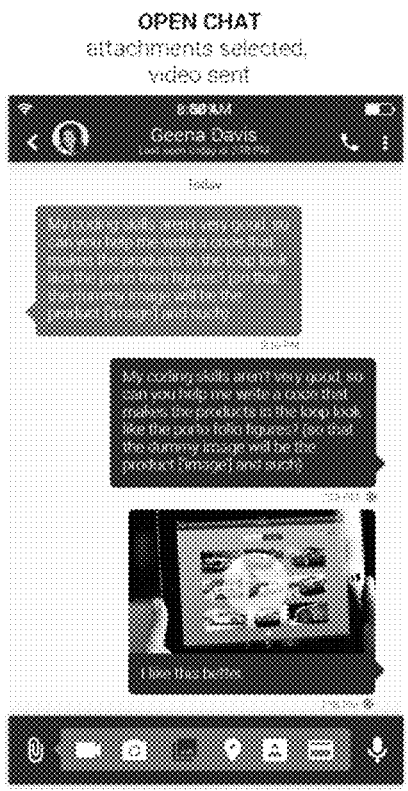
Figure 8L:

The technology also allows users to chat to each other. FIG. 8J shows an exemplary screen shot of an overview of active conversations, and FIG. 8K shows a specific conversation between two users. In addition to text, users are capable of sharing photos, videos, location information, contact cards, and voice notes. Users who are chatting as a result of a match may also receive in-chat messages providing discounts, for example for a cup of coffee at a nearby restaurant, to encourage them to meet in person. As shown in FIG. 8L, when opening a new conversation a list of pre-populated ice breakers is included which include customized portions such as the relevant goal that the two users were matched on. The user can easily select from one of the ice breakers to start a conversation.

The technology may include other functionality that is restricted to certain users, such as premium users that pay a recurring fee. Such functionality may include the ability to invoice and accept payments from non-premium users. It is envisaged that users will be able to provide payment by using a credit card, have the funds held in escrow by the server system until both parties agree that the work is acceptable, and get a receipt for the payment once transferred. Premium users may be able to constrain goals to exclude people belonging to specific networks, e.g. "I want to meet an electrical engineer" but excluding those that work at Siemens, or to show only people belonging to specific networks, e.g. "I want to meet someone who can advise me on radio design" but only including people who belong to the Space Radio Inc. network. Premium users may be able to specify if these goals create karma cards for the user's contacts.

Functionality available to premium users may also include the ability to see which contacts are in a specific location, e.g. London, see which contacts have contacts in a specific location, and get matches using shared contacts of people in the same network. Additional functionality may include the ability to automatically turn matching and location sharing off when in certain neighborhoods, cities or countries, or to lock location to a specific neighborhood or city. The system may allow deep links to a premium user's mobile application profile to be automatically published to search engines such as Google™, so that when anyone searches for a relevant goal the link to that user's mobile application profile should appear. Further functionality may include custom predefined chat responses for matches, or for custom introduction cards to be used when two users belonging to a particular network are introduced. The server system may also allow premium users to obtain infographics for specific goals or regions, such as to see how many people have goals with particular keywords in a region, or to see a geographic visualization of goals in a particular neighborhood or city.

Figure 9:
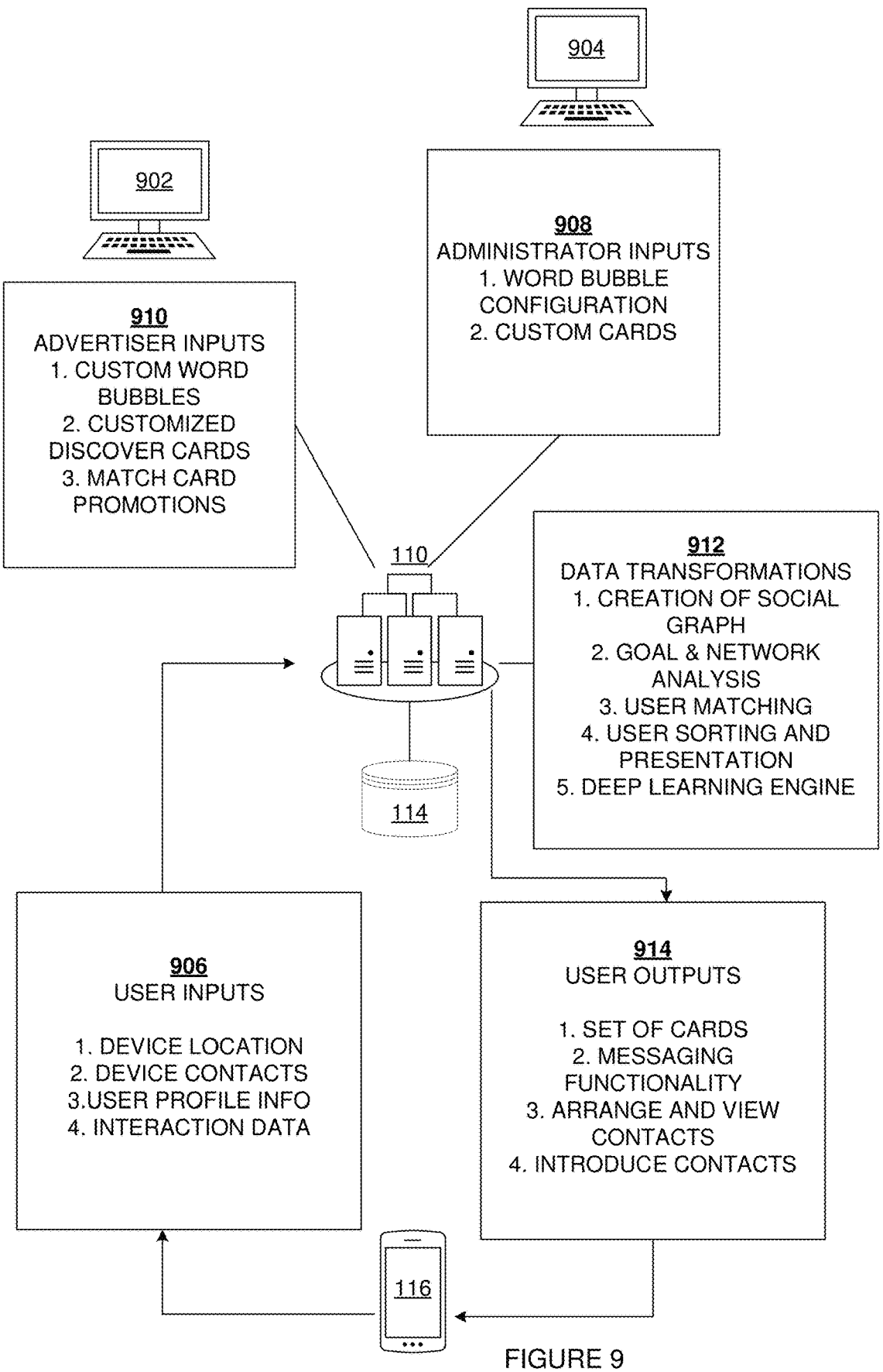
FIG. 9 is a schematic illustration summarizing the inputs, outputs and data transformations carried out at the server system.

FIG. 9 is a schematic illustration summarizing the inputs, outputs and data transformations conducted at the server system (110). The main entities that connect to the server system are electronic devices (116), of which only one is shown, advertisers (902), and an administrator (904). User input (906) that is provided by the electronic device to the server system may include the device location (including ongoing updates as to the device location), device contacts, user-entered profile information and interaction data. The interaction data includes information on how the user has interacted with the mobile application as previously described.

Administrator inputs (908) may include the set of categories with their lists of object, properties and values for creating the visual word bubble interfaces, and custom cards which could include discover cards, learn cards, add to profile cards and update software cards as previously described.

Advertiser inputs (910) could include custom word bubbles to be shown to users in specific locations, and/or users who have entered goals with particular keywords, customized discover cards, and requests that specific match cards be the first match cards in a ranked list below those for whom the user has a personal method of making a trust judgment about the matched user (such as a shared contact or shared network).

The server system (110) uses all these inputs and conducts a number of data transformations (912), which have been described above and which include creation of a social graph, goal and network analysis, user matching, and user sorting and presentation. The server system also implements a deep learning engine as previously described. The user output (914) that the server system then sends to the electronic devices (116) includes the different types of cards, the ability to message between users, the ability to arrange and view contacts, and the ability to introduce contacts.

Figure 10:
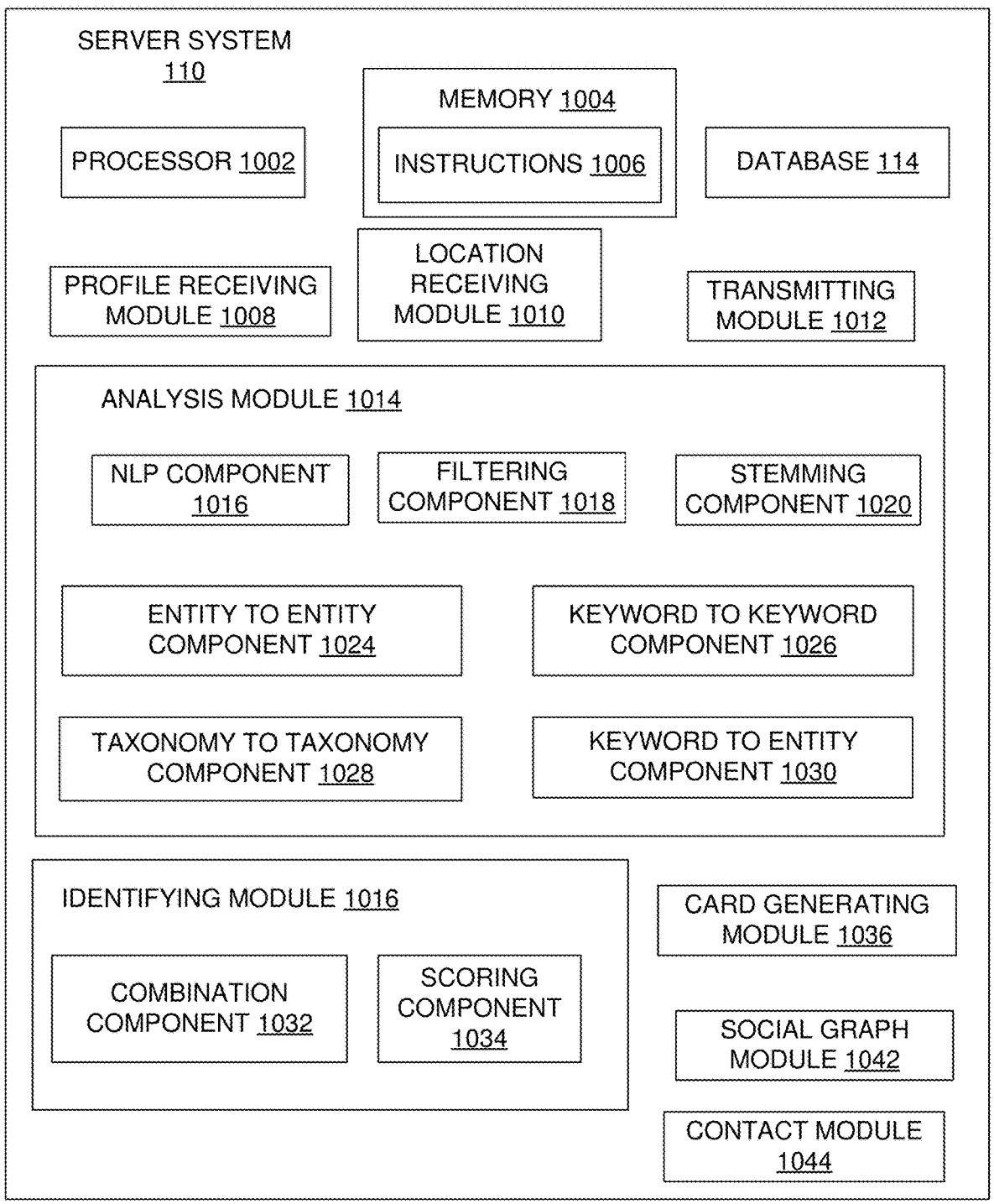
FIG. 10 is a schematic illustration of logical components of an exemplary server system.

Logical components of an exemplary server system (110) are shown in FIG. 10. The server system (110) may include at least one processor (1002), a hardware module, or a circuit for executing the functions of the described components or modules. The described components or modules of the system may be software units executing on the at least one processor (1002). Memory (1004) may be configured to provide computer instructions (1006) to the at least one processor (1002) to carry out the functionality of the components. The server system (110) provided may be multiple servers provided at various locations.

The server system may include a profile receiving module (1008), a database (114), a location receiving module (1010), a transmitting module (1012), an analysis module (1014), an identifying module (1016), a card generating module (1036), a social graph module (1044), and a contact module (1046).

The profile receiving module (1008) may be for receiving a user's profile information that includes at least one user-selected goal and the database (114) may be for storing the user profile. The location receiving module (1010) may be for receiving location information as to the geographic location of the user.

The analysis module (1014) may be for analyzing the user goal to extract entity and keyword information therefrom and may have a number of components. A natural language processing (NLP) component (1016) may be for analyzing each goal and network item and breaking them into entities, taxonomies and keywords, a filtering component (1018) for filtering and stripping items of entities that are to be ignored and a stemming component (1020) for stemming entities and keywords using a porter English stem. The analysis module (1014) may also include an entity to entity component (1024) for matching an entity to another entity, a keyword to keyword component (1026) for matching a keyword to another keyword, a taxonomy to taxonomy component (1028) for matching a taxonomy to another taxonomy, and a keyword to entity component (1030) for matching a keyword to an entity.

The identifying module (1016) may be for identifying matching user profiles of other users based on the physical proximity between the user and the other users, and the transmitting module (1012) may be for transmitting the ranked list of user profiles to the electronic device to be displayed to the user. The identifying module (1016) may have a combination component (1032) for combining matches between particular pair of items, and a scoring component (1034) for calculating a text score and a trust score.

The card generating module (1036) may be for generating cards to be presented to a user, and the social graph module (1042) may be for building a social graph based on the combined data of all users' contact databases. The contact module (1044) may be for arranging a user's contact list based on closest possible matches or based on geographical location.

Figure 11:
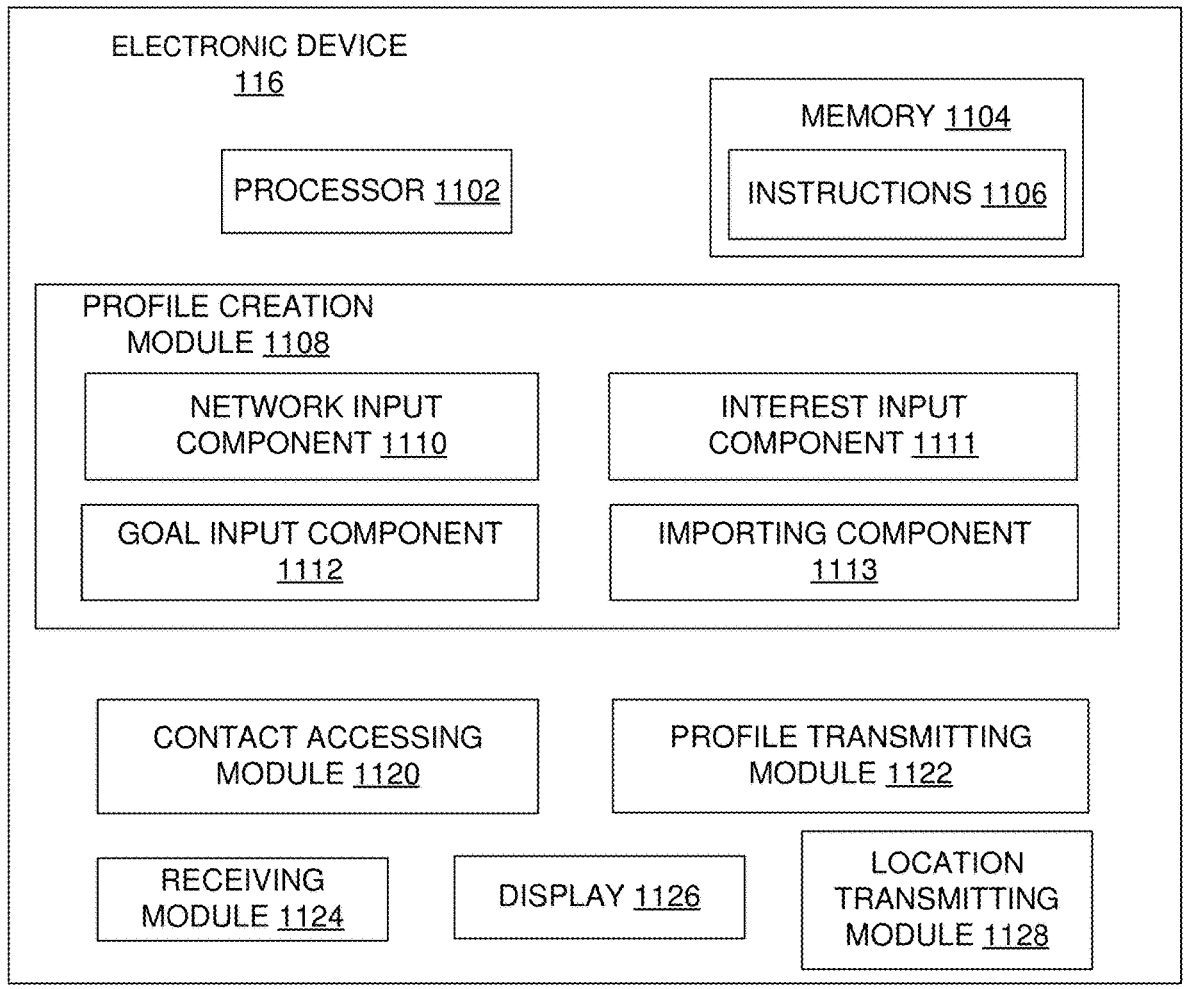
FIG. 11 is a schematic illustration of logical components of an exemplary electronic device.

Logical components of an exemplary electronic device (116) are shown in FIG. 11. The electronic device (116) may include at least one processor (1102), a hardware module, or a circuit for executing the functions of the described components or modules. The described components or modules of the system may be software units executing on the at least one processor (1102). Memory (1104) may be configured to provide computer instructions (1106) to the at least one processor (1102) to carry out the functionality of the components.

The device (116) may include a profile creation module (1108), a profile transmitting module (1122), a location transmitting module (1128), a receiving module (1124), a display (1126) and a contact accessing module (1120).

The profile creation module (1108) may be for inputting profile information that includes at least one user-selected goal. The profile creation module (1108) may have a network input component (1110) for inputting information as to a user's networks, an interest input component (1111) for inputting information as to a user's interest, a goal input component (1112) for inputting information as to a user's goals, and an importing component (1113) for importing profile information from other networks.

The profile transmitting module (1122) may be for transmitting the user profile to a server system to be stored on a database. The receiving module (1124) may be for receiving a ranked list of user profiles of other users from the server system, the server system identifying matching user profiles of other users stored on the database by analyzing the user goal to extract entity and keyword samples therefrom, identifying matching user profiles of other users stored on the database that have user goals with similar entity and keyword samples therein, and ranking the user profiles of the other users based on the physical proximity between the user and the other users. The display (1126) may be for presenting the ranked user profiles to the user. Other modules may also be provided, such as a contact accessing module (1120) for accessing a list of contacts stored on the electronic device.

Figure 12:
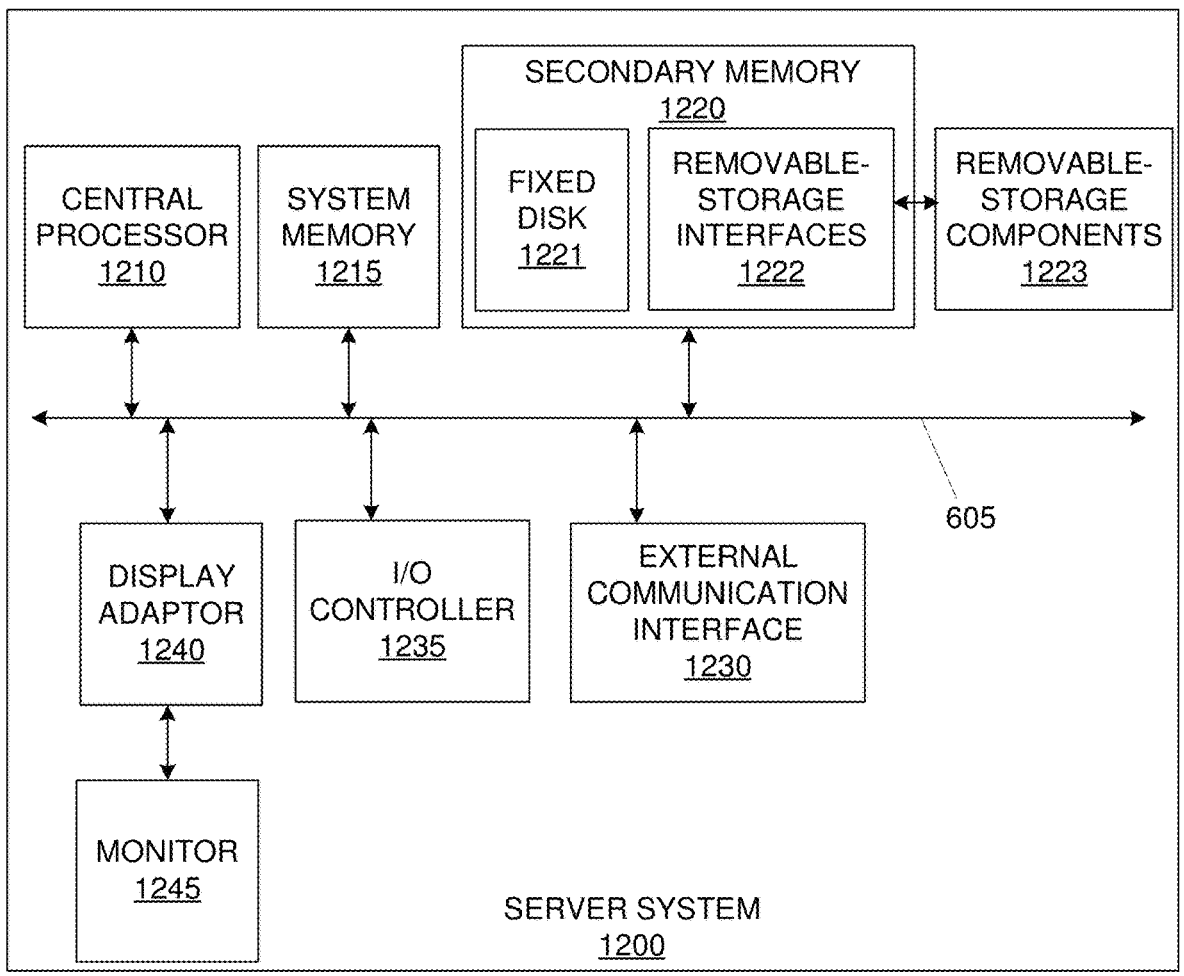
FIG. 12 illustrates an example of a server system in which various aspects of the disclosure may be implemented; and, FIG. 13 illustrates an example of an electronic device that may be used in embodiments of the disclosure.

FIG. 12 illustrates an example of a server system (1200) in which various aspects of the disclosure may be implemented. The server system (1200) may be suitable for storing and executing computer program code. The various participants and elements in the previously described system diagrams, may use any suitable number of subsystems or components of the server system (1200) to facilitate the functions described herein.

The server system (1200) may include subsystems or components interconnected via a communication infrastructure (1205) (for example, a communications bus, a cross-over bar device, or a network). The server system (1200) may include one or more central processors (1210) and at least one memory component in the form of computer-readable media. In some configurations, a number of processors may be provided and may be arranged to carry out calculations simultaneously.

The memory components may include system memory (1215), which may include read only memory (ROM) and random access memory (RAM). A basic input/output system (BIOS) may be stored in ROM. System software may be stored in the system memory (1215) including operating system software. The memory components may also include secondary memory (1220). The secondary memory (1220) may include a fixed disk (1221), such as a hard disk drive, and, optionally, one or more removable-storage interfaces (1222) for removable-storage components (1223). The removable-storage interfaces (1222) may be in the form of removable-storage drives (for example, magnetic tape drives, optical disk drives, etc.) for corresponding removable storage-components (for example, a magnetic tape, an optical disk, etc.), which may be written to and read by the removable-storage drive. The removable-storage interfaces (1222) may also be in the form of ports or sockets for interfacing with other forms of removable-storage components (1223) such as a flash memory drive, external hard drive, or removable memory chip, etc.

The server system (1200) may include an external communications interface (1230) for operation of the server system (1200) in a networked environment enabling transfer of data between multiple server systems (1200). Data transferred via the external communications interface (1230) may be in the form of signals, which may be electronic, electromagnetic, optical, radio, or other types of signal. The external communications interface (1230) may enable communication of data between the server system (1200) and other server systems including servers and external storage facilities. Web services may be accessible by the server system (1200) via the communications interface (1230). The external communications interface (1230) may also enable other forms of communication to and from the server system (1200).

The computer-readable media in the form of the various memory components may provide storage of computer-executable instructions, data structures, program modules, software units and other data. A computer program product may be provided by a computer-readable medium having stored computer-readable program code executable by the central processor (1210). A computer program product may be provided by a non-transient computer-readable medium, or may be provided via a signal or other transient means via the communications interface (1230).

Interconnection via the communication infrastructure (1205) allows the central processor (1210) to communicate with each subsystem or component and to control the execution of instructions from the memory components, as well as the exchange of information between subsystems or components. Peripherals (such as printers, scanners, cameras, or the like) and input/output (I/O) devices (such as a mouse, touchpad, keyboard, microphone, and the like) may couple to the server system (1200) either directly or via an I/O controller (1235). These components may be connected to the server system (1200) by any number of means known in the art, such as a serial port. One or more monitors (1245) may be coupled via a display or video adapter (1240) to the server system (1200).

Figure 13:
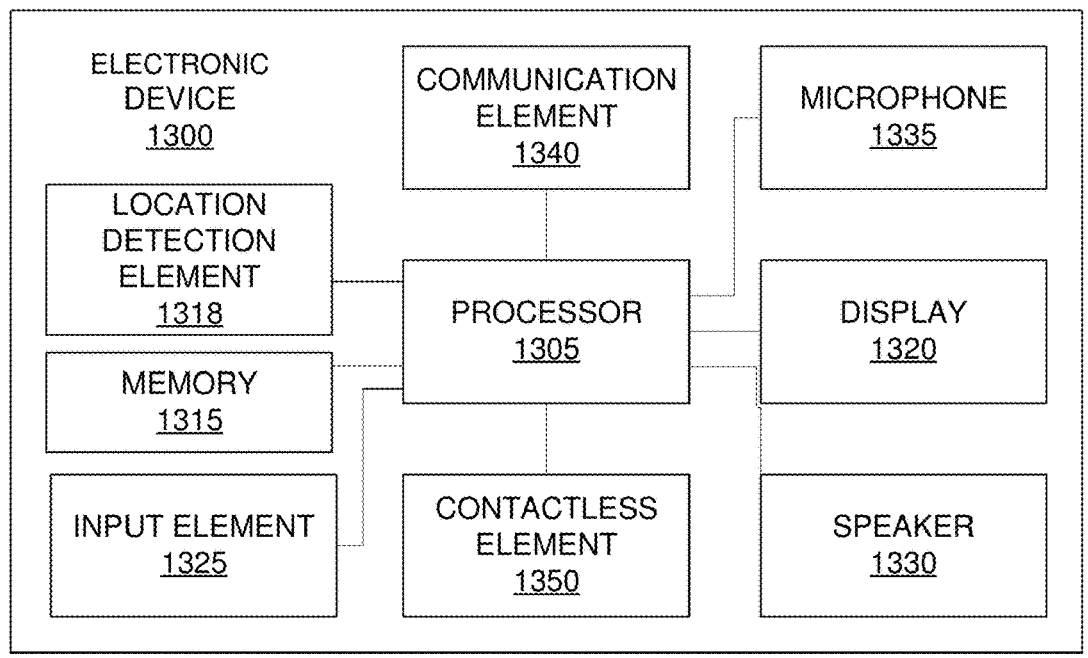

FIG. 13 shows a block diagram of an electronic device (1300). The various participants and elements in the previously described system diagrams, for example the described users, may use any suitable number of subsystems or components of the electronic device (1300). The electronic device (1300) may be a cell phone, a feature phone, a smartphone, a satellite phone, or a computing device having a phone capability.

The electronic device (1300) may include a processor (1305) (e.g., a microprocessor) for processing the functions of the electronic device (1300) and a display (1320) to allow a user to see the phone numbers and other information and messages. The electronic device (1300) may further include an input element (1325) to allow a user to input information into the device (e.g., input buttons, touch screen, etc.), a speaker (1330) to allow the user to hear voice communication, music, etc., and a microphone (1335) to allow the user to transmit his or her voice through the electronic device (1300). The processor (1310) of the electronic device (1300) may connect to a memory (1315). The memory (1315) may be in the form of a computer-readable medium that stores data and, optionally, computer-executable instructions.

The electronic device (1300) may also include a communication element (1340) for connection to communication channels (e.g., a cellular telephone network, data transmission network, Wi-Fi™ network, satellite-phone network, Internet network, Satellite Internet Network, etc.). The communication element (1340) may include an associated wireless transfer element, such as an antenna. The communication element (1340) may include a subscriber identity module (SIM) in the form of an integrated circuit that stores an international mobile subscriber identity and the related key used to identify and authenticate a subscriber using the electronic device (1300). One or more subscriber identity modules may be removable from the electronic device (1300) or embedded in the electronic device (1300). In the case of the latter, the subscriber identify module may be a virtual subscriber identity module.

The electronic device (1300) may further include a contactless element (1350), which is typically implemented in the form of a semiconductor chip (or other data storage element) with an associated wireless transfer element, such as an antenna. The contactless element (1350) may be associated with (e.g., embedded within) the electronic device (1300) and data or control instructions transmitted via a cellular network may be applied to the contactless element (1350) by means of a contactless element interface (not shown). The contactless element interface may function to permit the exchange of data and/or control instructions between mobile device circuitry (and hence the cellular network) and the contactless element (1350). The contactless element (1350) may be capable of transferring and receiving data using a near field communications (NFC) capability (or near field communications medium) typically in accordance with a standardized protocol or data transfer mechanism (e.g., ISO 14443/NFC). Near field communications capability is a short-range communications capability, such as radio-frequency identification (RFID), Bluetooth™, infra-red, or other data transfer capability that can be used to exchange data between the electronic device (1300) and an interrogation device. Thus, the electronic device (1300) may be capable of communicating and transferring data and/or control instructions via both a cellular network and near field communications capability. The electronic device may also include a location detection element (1318), such as a Global Positioning System (GPS) microchip.

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

Any of the steps, operations, components or processes described herein may be performed or implemented with one or more hardware or software units, alone or in combination with other devices. In one embodiment, a software unit is implemented with a computer program product comprising a non-transient computer-readable medium containing computer program code, which can be executed by a processor for performing any or all of the steps, operations, or processes described. Software units or functions described in this application may be implemented as computer program code using any suitable computer language such as, for example, Java™, C++, or Perl™ using, for example, conventional or object-oriented techniques. The computer program code may be stored as a series of instructions, or commands on a non-transitory computer-readable medium, such as a random access memory (RAM), a read-only memory (ROM), a magnetic medium such as a hard-drive, or an optical medium such as a CD-ROM. Any such computer-readable medium may also reside on or within a single computational apparatus, and may be present on or within different computational apparatuses within a system or network.

Flowchart illustrations and block diagrams of methods, systems, and computer program products according to embodiments are used herein. Each block of the flowchart illustrations and/or block diagrams, and combinations of blocks in the flowchart illustrations and/or block diagrams, may provide functions which may be implemented by computer readable program instructions. In some alternative implementations, the functions identified by the blocks may take place in a different order to that shown in the flowchart illustrations.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. The described operations may be embodied in software, firmware, hardware, or any combinations thereof.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

Finally, throughout the specification and claims unless the contents requires otherwise the word 'comprise' or variations such as 'comprises' or 'comprising' will be understood to imply the inclusion of a stated integer or group of integers but not the exclusion of any other integer or group of integers.

The invention claimed is:

1. A computer-implemented method for dynamically identifying and presenting matching user profiles to a user comprising, at an electronic device:
   receiving at least one user-selected goal;
   transmitting the at least one user-selected goal and a phone number associated with the user to a server system;
   transmitting location information obtained by a location detection system of the electronic device as to the geographic location of the user to the server system;
   providing access to multiple contacts stored in a contact directory on the electronic device of the user to the server system, wherein a contact includes a phone number;
   receiving a ranked list of user profiles of other users from the server system, the server system identifying matching user profiles of other users stored on the database by analyzing the at least one user-selected goal to extract entity and keyword samples therefrom, identifying matching user profiles of other users stored on the database that have complementary user goals with similar entity and/or keyword samples therein, and applying a scoring function which scores identified matching user profiles for each pair of the user and other users based on: an overall text proximity score, a geographical proximity, a social proximity being a number of common contacts shared between the user and the other users as identified by their phone numbers, and a personality proximity, to obtain a ranked list of user profiles;
   presenting the ranked user profiles to the user on a display of the electronic device; and
   using shared contacts to facilitate introduction or communication between users;
   wherein the server system also calculating a user trust vector and storing the user trust vector on the database in association with a user profile, wherein the user trust vector includes factors that indicate the user's preference for matches by goal, geographical proximity, social proximity and personality proximity, and for the matching user profiles to be ranked by at least partially using the user trust vector; and
   wherein the user trust vector is automatically recalculated by analyzing and classifying the user based on prior behavioral data that includes the times and manner in which a user interacts with other user profiles.

2. The method as claimed in claim 1, wherein the user-selected goal is a string of words provided by the user and is categorized as either a service offered by the user, or as a person, service or thing sought by the user.

3. The method as claimed in claim 1, wherein matching user profiles of other users are identified that have differently categorized user goals with similar entity and keyword samples therein.

4. The method as claimed in claim 1, including the steps of:
   displaying in association with a presented user profile, the details of a contact shared by the user and the user of the presented user profile;
   receiving a request from the user for the shared contact to introduce the user and the user of the presented user profile;
   transmitting the request to the server system, the server system transmitting the request to the shared contact; and
   responsive to the shared contact providing an introduction, receiving the introduction from the server system and displaying the introduction to the user.

5. A system for dynamically identifying and presenting matching user profiles to a user, the system comprising:
   an electronic device of the user comprising a processor and a memory configured to provide computer program instructions to the processor to execute a method comprising:
      providing user profile information that includes at least one user-selected goal and a phone number associated with the user;
      providing access to multiple contacts stored in a contact directory on the electronic device of the user, wherein a contact includes a phone number; and
      providing, from a location detection system of the electronic device of the user, location information as to the geographic location of the user;
   the system further comprising:
      a database configured to store the user profile; and
      a server system comprising a processor and a memory configured to provide computer program instructions to the processor to execute a method comprising:
         analyzing the at least one user-selected goal to extract entity and keyword samples therefrom;
         identifying matching user profiles of other users including applying a scoring function which scores identified matching user profiles for each pair of the user and other users based on: an overall text proximity score, a geographical proximity, a social proximity being a number of common contacts shared between the user and the other users as identified by their phone numbers, and a personality proximity, to obtain a ranked list of user profiles;
         calculating a user trust vector and storing the user trust vector on the database in association with the user profile, wherein the user trust vector includes factors that indicate the user's preference for matches by goal, geographical proximity, social proximity and personality proximity, and for the matching user profiles to be ranked by at least partially using the user trust vector; and the user trust vector being automatically recalculated by analyzing and classifying the user based on prior behavioral data that includes the times and manner in which a user interacts with other user profiles;
         transmitting the ranked list of user profiles to the electronic device to be displayed to the user; and
         using shared contacts from user contact directories to facilitate introduction or communication between users.

6. The system as claimed in claim 5, wherein the user-selected goal is a string of words provided by the user and is categorized as either a service offered by the user, or as a person, service or thing sought by the user.

7. The system as claimed in claim 5, wherein matching user profiles of other users are identified that have differently categorized user goals with similar entity and keyword samples therein.

8. The system as claimed in claim 5, including the method executed at the electronic device including:
   displaying in association with a presented user profile, the details of a contact shared by the user and the user of the presented user profile;

receiving a request from the user for the shared contact to introduce the user and the user of the presented user profile;
transmitting the request to the server system, the server system transmitting the request to the shared contact; and
responsive to the shared contact providing an introduction, receiving the introduction from the server system and displaying the introduction to the user.

9. The system as claimed in claim 5, including the method executed at the server system including:
analyzing the user-selected goal to extract taxonomy samples therefrom, wherein the taxonomy samples are hierarchical positioning of core ideas in a larger tree of ideas, and for matching user profiles to be identified that have complementary user goals with similar taxonomy samples therein.

10. The system as claimed in claim 5, including the method executed at the server system including:
receiving, from an electronic device of the user, user profile information including at least one user goal and storing the user profile on the database, and wherein the user-selected goal is a selected user goal stored in the user profile in the form of a string of words provided by the user and categorized as either a service offered by the user, or as a person, service or thing sought by the user.

11. The system as claimed in claim 5, wherein the user profile of the user includes the user's networks, and the personal proximity is based on the number of common networks shared between the user and the other users.

12. The system as claimed in claim 5, wherein the user profile includes the user's interest, and the personality proximity is based on the number of common interests shared between the user and the other users.

13. The method as claimed in claim 5, including the method executed at the server system including:
transmitting for display in association with a presented user profile, the details of a contact shared by the user and the user of the presented user profile;
receiving a request from the user for the shared contact to introduce the user and the user of the presented user profile;
transmitting a request to the shared contact for an introduction;
receiving an introduction from the shared contact; and
transmitting the introduction to the user and the user of the presented user profile.

14. A computer-implemented method for dynamically identifying and presenting matching user profiles to a user comprising:
an electronic device of the user providing at least one user-selected goal and a phone number associated with the user;
storing a user profile on a database;
providing access to multiple contacts stored in a contact directory on the electronic device of the user, wherein a contact includes a phone number;
a location detection system of the electronic device of the user providing location information as to the geographic location of the user;
a server system:
analyzing the at least one user-selected goal to extract entity and keyword samples therefrom;
identifying matching user profiles of other users stored on the database that have complementary user goals with similar entity and/or keyword samples therein;
applying a scoring function which scores identified matching user profiles for each pair of the user and other users based on: an overall text proximity score, a geographical proximity, a social proximity being a number of common contacts shared between the user and the other users as identified by their phone numbers, and a personality proximity, to obtain a ranked list of user profiles;
calculating a user trust vector and storing the user trust vector on the database in association with the user profile, wherein the user trust vector includes factors that indicate the user's preference for matches by goal, geographical proximity, social proximity and personality proximity, and for the matching user profiles to be ranked by at least partially using the user trust vector; and
wherein the user trust vector is automatically recalculated by analyzing and classifying the user based on prior behavioral data that includes the times and manner in which a user interacts with other user profiles;
transmitting the ranked list of user profiles to the electronic device to be displayed to the user; and
using shared contacts from user contact directories to facilitate introduction or communication between users.

15. The method as claimed in claim 14, wherein the user-selected goal is analyzed to extract taxonomy samples therefrom, wherein the taxonomy samples are hierarchical positioning of core ideas in a larger tree of ideas, and for matching user profiles to be identified that have complementary user goals with similar taxonomy samples therein.

16. The method as claimed in claim 14, including receiving, from an electronic device of the user, user profile information including at least one user goal and storing the user profile on the database, and wherein the user-selected goal is a selected user goal stored in the user profile in the form of a string of words provided by the user and categorized as either a service offered by the user, or as a person, service or thing sought by the user.

17. The method as claimed in claim 16, wherein matching user profiles of other users are identified that have differently categorized user goals with similar entity and keyword samples therein.

18. The method as claimed in claim 14, wherein the user profile of the user includes the user's networks, and the personal proximity is based on the number of common networks shared between the user and the other users.

19. The method as claimed in claim 14, wherein the user profile includes the user's interest, and the personal proximity is based on the number of common interests shared between the user and the other users.

20. The method as claimed in claim 14, including the server system:
transmitting for display in association with a presented user profile, the details of a contact shared by the user and the user of the presented user profile;
receiving a request from the user for the shared contact to introduce the user and the user of the presented user profile;
transmitting a request to the shared contact for an introduction;
receiving an introduction from the shared contact; and
transmitting the introduction to the user and the user of the presented user profile.

* * * * *